United States Patent Office 3,397,386
Patented Aug. 13, 1968

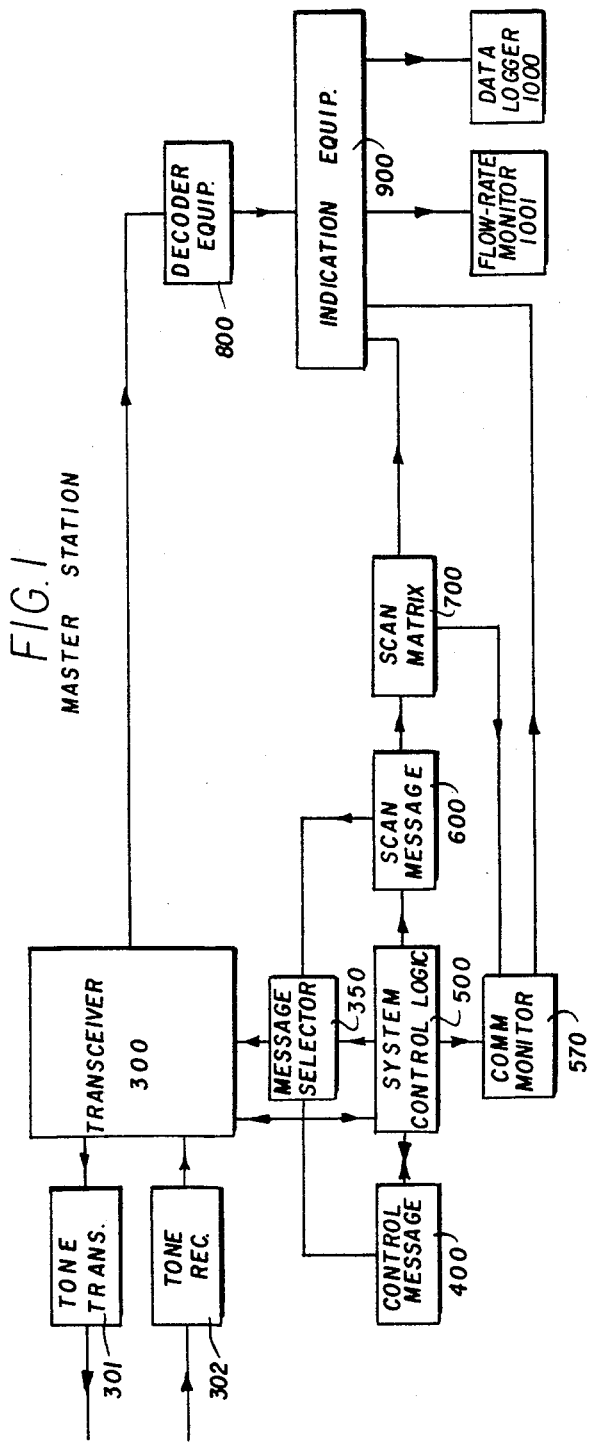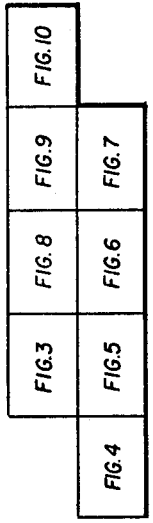

3,397,386
TELEMETERING AND SUPERVISORY CONTROL SYSTEM HAVING NORMALLY CONTINUOUS TELEMETERING SIGNALS
Bernard W. Bishup, Elk Grove Village, and Anthony A. Repeta and Frank C. Giarrizzo, Chicago, Ill., assignors, by mesne assignments, to Leeds & Northrup Company, Philadelphia, Pa., a corporation of Pennsylvania
Filed Apr. 3, 1963, Ser. No. 270,312
9 Claims. (Cl. 340—163)

ABSTRACT OF THE DISCLOSURE

A central to remote station supervisory control and telemetering station is disclosed. Equipment monitoring digital address signals are normally continuously transmitted to the remote station. Manually operated control circuitry is provided at the central station for interrupting the monitoring signals and sending control signals to the remote station equipment.

This case discloses a combined digital telemetering and supervisory control system for use in petroleum pipe line networks and similar environments.

More particularly it pertains to a system providing means for selecting and operating control equipment at a distant point, the acquisition of data such as pressure, temperature, etc. in quantitative form, and also provides continuous telemetering of the output of a single device with acquisition of data from several devices upon demand of a master station operator. It will provide continuous scanning of several indication devices using multiplexing techniques to initiate a scan sequence in response to detection of a limiting signal at a remote location. The present system is so arranged that during a scan cycle all telemetered data is updated continuously and all supervisory indications are properly displayed at a master station, a permanent record of telemetered data is automatically provided on a periodic basis. Equipment at locations remote to the master station is controlled from the master station, and provides appropriate response information to the master station when the control operation is completed.

Accordingly it is the object of this invention to provide a system for telemetering and controlling equipment at a remote or number of remote stations from a single master station in a petroleum pipeline or similar system.

A first feature of the instant system is the provision of high speed operation based upon using electronic circuitry.

A second feature is the use of digital transmission for telemetering information. A third feature is the inclusion of facilities for checking coded transmissions between remote and master stations.

Another feature of the instant system is the inclusion of facilities for visually displaying updated telemetered information.

Yet another feature is the inclusion of means for keeping a permanent record of telemetered information received at a master station. A final feature is the inclusion of circuitry whereby a constant scan of information points may be interrupted to access and operate a control point, in a distant or remote office and automatically resume the scan after said operation has been effected.

The above mentioned and other objects and features of this invention and the manner of obtaining them will become more apparent, the invention itself will be best understood by reference to the following description of an embodiment of the invention taken in conjunction with the accompanying drawings comprising FIGURES 1 to 17 wherein:

FIGURES 1 and 2 taken in combination comprise a block diagram of a digital telemetering and supervisory control system;

FIGURES 3 to 10 comprise a diagram showing the equipment in a master station for use in the above mentioned system;

FIGURES 11 to 15 comprise a diagram showing equipment of a remote station for use in the instant system;

FIGURE 16 shows how

FIGURE 17 shows how

SYSTEM ORGANIZATION

Figure 2:
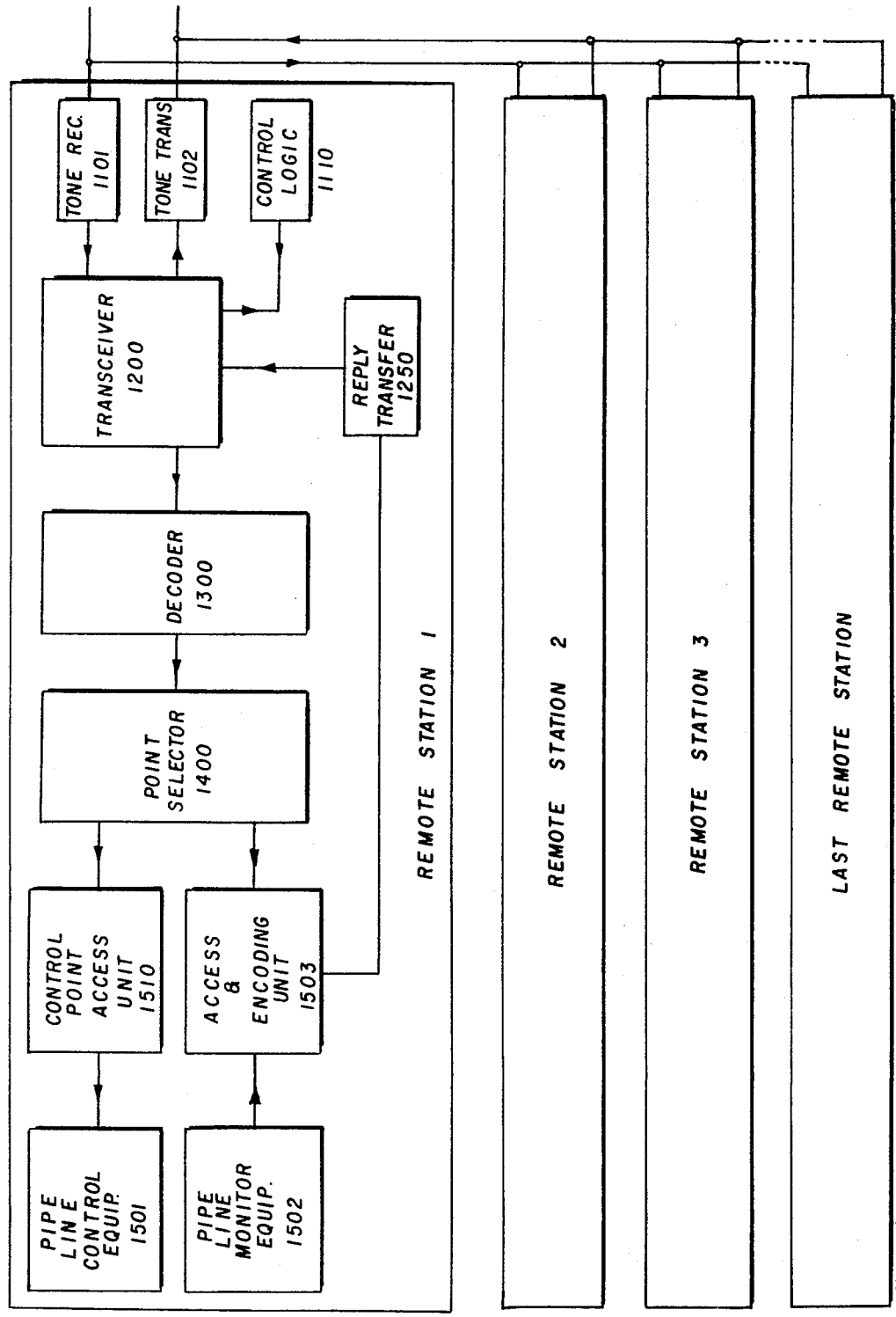

Referring now to the block diagram shown on FIGURES 1 and 2 in combination, applicant's combined digital supervisory control and telemetering system consists of a master station (FIGURE 1) which continuously scans and monitors a number of remote stations (FIGURE 2). During each scan cycle all telemetered values are updated by digital indication equipment 900 and all supervisory indications are properly displayed at the master station.

Communication links used in the instant system for telemetering and supervisory control may be telegraph, teletypewriter, or telephone circuits on wire, microwave or power line carrier channels. The speed which each of these facilities can handle successive bits of information and the number of bits each can handle simultaneously determine the maximum speed of transmission possible, the error detecting methods that may be used, and the available method of transmitting digital information from the source to the link. Thus the bandwidth capabilities of the communication link and the manner in which that bandwidth is assigned to derive channels, determine the maximum information bit or pulse-rate capabilities of that link. The number of simultaneous information channels possible on the link depends on bandwidth frequency versus attenuation curve, the bit rate that can be used and requirements placed on the link by the channel-deriving equipment. Voice grade telephone and microwave circuits naturally have the ability to derive more simultaneous information channels than telegraph or teletypewriter links.

In a supervisory control and telemetering system like that shown herein based on the above considerations, it may be possible to use a single communication link between the master station and the remote stations in the system, or individual communication links may be supplied between each remote station and the master station. Effectively both parallel and series connections between the remote stations and the master station are possible.

A permanent record of telemetered values is automatically provided by the data logger 1000 which includes an electric typewriter. The typewriter is programmed for periodic print-outs by a 0 to 120 minute timer. A digital clock provides for time identification of each print-out. A flow rate monitor 1001 is provided for selective flow field data points. The monitored flow is checked during each scan cycle to insure that its value lies within manually selected limits throughout an adjustable period of time.

A communications monitor 570 provided for both point and station communication fault detection.

Control of remote station units such as valves, motors, pumps, etc, 1501 is accomplished at the master station by depression of appropriate pushbuttons that form a portion of the control message unit 400. The scan cycle is automatically interrupted during this control operation and automatically resumed afterward. A visual indication is returned to the master station after one of the control pushbuttons are operated in response to operation in the field of the remote equipment. The visual indication is extinguished when the desired action has been accomplished and reported by the remote station.

Electronic logic used in the acquisition and storage of data provides for extremely fast operation. The speed is such that the system will completely update the status of all initially included field indications and variables in approximately 20 seconds.

The system has two distinct modes of operation: automatic scan, and point control. Normally, the system operates in the automatic or supervisory scanning mode with the master station continuously scanning and interrogating all points in the system. The operation is completely automatic during each scan cycle all points report their current status. Thus the status of all equipment alarms and telemetered data is continuously updated and appropriately displayed on the indication equipment 900. The system is manually placed in the point control mode by the operator whenever he desires to perform a control action on any device at any remote station. The operator makes his control selection by depressing an appropriate pushbutton in the control message equipment 400. This action interrupts the scan that is originating in the scan message unit 600 while the proper control message is transmitted to the remote station. Upon proper receipt of a control message the remote station sends an immediate reply to the master station. This reply is in the form of a visual indication. This visual indication is extinguished when the desired control action has been completed and reported by the remote station. During any control operation, the operator is constantly informed of off, on, or in transit conditions in the field equipment. Resetting of various field equipment alarm or monitoring equipment may also be accomplished in similar manner.

All alarms and their automatic changes at the remote stations will sound an audible alarm and flash the appropriate indicating lamp in connection with the communication monitor 570 at the master station to show the new condition of the equipment. Depression of an alarm silence pushbutton will silence the audible alarm and allow the indicating lamp associated therewith to remain lit until the alarm or false condition has been corrected. Manual controls are included at the master station to stop the automatic scan and to manually interrogate any point in the system. An operator can easily select any point by operating a thumb operated digit switch in either the control message unit 400 or the scan message unit 600, and by pressing an associated key switch to enable the point selected. The operator can observe visual indicators provided to visually see the messages transmitted and received, as well as the conditions of other key circuits in the system. The operator can also introduce various fault conditions and check out routines into the system and thereby confirm system operations under adverse conditions.

Safeguards are provided to prevent undesirable results due to mutilation of a message anywhere in the system. If interrogation from the master station is garbled it will be rejected at the remote station and no reply will be received within the expected time. In this event the system will leave its display indication associated with that point unchanged and reinterrogate the point. The expectation is that the message will be successfully transmitted during the next attempt and indication conditions will be updated at that time. If a reply message is rejected or not received after three successive interrogations, the system bypasses the point and yields a point communication alarm in the communication monitor 570 for the remote station under interrogation. Silencing of the associated audible alarm allows the display lamp to flash each time a subsequent point communication fault occurs. The system might be subject to breakdown due to loss of critical elements such as a communication channel itself. To alert the operator in such an event, the communication monitor 570 is provided. With this equipment the operator is alerted with a station communication alarm from any one station. The combination of point and station communication alarm gives the operator a means of detecting both intermittent and sustained failures involving a single point as well as informing the general failure of control or communication equipment on a per station basis.

The terms used throughout the description of applicant's system conform to the following definitions: decimal digit: a decimal digit is one of the digits 0 through 9 used in a numbering system of base 10. Binary digit or bit: a binary digit is one of the digits 0 or 1 used in a numbering system of base 2, it is the least possible quantity of information. The abbreviation "bit" is commonly used to represent the binary digit. Binary-coded decimal digit: this is a decimal digit which is represented by a word set of binary bits if the weight given to each bit in the binary set increases uniformly to the left (corresponding to a rational binary number system), the code is referred to as 8–4–2–1. Numerous other codes are possible including one with relative weights of 7–4–2–1 which is used in applicant's system. Constant ratio code: a constant ratio code is an array of bits in which the ratio of "ones" to "zeros" is constant. Word: a word is any ordered set of bits. Message: a message is a group of words treated as a unit for purposes of transmission. Messages from the master station are point addresses. Messages from the remotes are Datex, Varac or indication information transmitted in response to a point address.

Referring now to code techniques and code checking means including the following definitions are also set forth. Characteristics of words: each word transmitted from the master station is a five bit sequence representing a decimal digit and carrying an extra bit for checking purposes. Thus in this system each word is a binary coded decimal digit. This word is coded with the weight 7–4–2–1–0. The decimal value is derived and the weights indicated except in the case of the decimal 0 which is represented as 1–1–0–0–0. In a straight forward derivation, a decimal zero would be represented by 0–0–0–0. This apparent arbitrary departure is made to secure the advantage of a constant ratio code. The 7–4–2–1 wording is used instead of 8–4–2–1 for the same reason. The fifth (zero) bit in the above sequence is inserted arbitrarily to make the number of binary ones in the word always true. Each word transmitted from a remote station receives its characteristics from the particular encoding device which is reporting. Words representing data from Varac and Datex encoders will be in the form of Varac or cyclic codes from these encoders. The twelve bits from the Datex encoders and the fourteen bits from the Varac code will be distributed between the fifteen bits of intelligence transmitted from the remote station upon each interrogation. All unused bits will be transmitted as "zeros" all decoding of the Varac and cyclic codes will be performed with common circuits for each code at the master station which allows flexibility in the use of various types of encoding devices at the remote station.

The bits in each word are always transmitted serially and timed. The length of the bit is dependent upon the transmissions to be employed, for example, a transmission speed of 200 bits per second corresponds to a bit length of 5.0 milliseconds.

For transmission purposes only each word is preceded by a start bit and followed by a stop bit. These bits carry no intelligence but are used only for synchronizing the transmission equipment. They are added to each word as it is being transmitted and deleted after it has been received.

Each transmission in applicant's system will be composed of six words for purposes of error detection the first three words and the second three words are identical. Each message in the system contains only three words or fifteen bits of intelligence. Each message from a master station represents three decimal or 1000 possible specific combinations such as 000 through 999. Each of these combinations can be assigned a particular function such as starting, stopping or resetting of a unit or the requesting of data or status information. For example, it would require three of these 1000 combinations to start, stop or reset a particular pump, motor, etc. It would require one of these combinations to request the report of a particular pressure eading. It would require one combination, however, to request the report of status from three separate devices at a remote station. This is possible since each of the three intelligence words in the six word reply from that remote station can convey the status of any device or alarm.

As previously mentioned, transmissions from the remote stations are also composed of six words. Like transmissions from the master station to the remote station, the first three words are identical to the second three words. The three usable intelligence words, or fifteen bits are used to convey the twelve bits of intelligence from the Datex encoders, the fourteen bits of intelligence from a Varac encoder, or three five bit words, each word representing the present status of a device or alarm.

There are two methods of error detection employed in the system. These are 100% redundancy and constant ratio checking. It is felt that these methods are not only the most secure of the commonly employed error detection methods, but the most applicable to a high speed system operating under a continuous scan type program.

100% redundancy type error detection operates on a comparison basis. Each three words of intelligence is repeated bit by bit in a follow-up group of three words at the transmitting station. Only if the first three words and the second three words compare in word order and bit by bit sequence, will the message be accepted as valid at the receiving station. Therefore, in order for an error to be undetected, it would have to be duplicated in both groups in the exact same word and bit location.

Constant ratio checking is the second major error detection method employed, it can actually be thought of as a combination of parity checking and totalization. Not only does each five bit word always have to have an even number of "ones," but that number is always 2.

It is readily seen that in order for an error to go undetected using constant ratio checking, two bits would have to be in error, and their condition must be changed to opposite states. For example, a "one" would have to become a "zero" and a "zero" would have to be a "one." Both 100% redundancy and constant ratio checking are used on all control and interrogation requests to obtain maximum security against misinterpretation of a command or scan point selection.

100% redundancy error detection is used for all messages from the remote station to the matter station. The double transmission of identical messages provides a high degree of security and permits complete freedom of code output from the encoding devices. The remote possibility of an undetected error in the report of pressure, flow or tank level should be of minor concern because each point in the system as initially equipped is interrogated approximately every 20 seconds.

An undetected error in a status report would be even more unlikely than the redundancy error since such an erroneous report would have to take a specific form. For example, an "on" report for an alarm indication would have to be garbled in such a way that it became an "off" report in order for this faulty report to go undetected. Such a combination of events, while theoretically possible, is highly unlikely. Even if such an occurrence took place the point would be shortly reinterrogated and updated correctly.

Referring now to FIGURE 1, the major components of the master station are shown here. These include: the tone transmitter 301 and tone receiver 302. These units terminate the communications link. The tone transmitter 301 accepts binary bits in the form of D.C. pulses from the transceiver 300 and transmits them to the remote stations as one of two tones; one for a binary "one" and another tone for a binary "zero." Conversely the tone receiver accepts binary bits in the form of tones from the remote station and converts them to D.C. pulses for use by the transceiver.

The transceiver 300 functions alternately as a code transmitter and receiver. In the transmit mode it receives three words of intelligence with the bits in parallel (that is, all bits are received at the same time). The transceiver 300 stores the bits temporarily in such a way that each word can be transmitted twice, supplies the necessary start and stop bits for synchronizing, and transmits the entire message serially. In this mode it receives its input from the message selector 350, and its output keys the tone transmitter 301. In the receive mode the transceiver accepts a message in serial order, deletes the synchronizing bits, performs the redundancy check and delivers three non-redundant words with the bits in parallel. If the redundancy check fails the message is rejected. The normal mode of operation is received and it must be instructed to transmit. After a transmission it automatically resets to its receive mode. In the receive mode the transceiver receives its input from the tone receiver 302 and delivers its parallel output to decodes 800 and thence to the indication equipment 900. In addition, it provides logic outputs to the system control logic 500.

The decoders 800 decode the coded information received from the transceiver into binary coded decimal digits for presentation to the indication equipment 900. The indication equipment consists of in line digital indicators which decode, display and store information received by the decoder 800 in Varca or Datex code form. Each in line digital indicator is the indication equipment, is individually selected by the scan matrix 700 when its data is to be updated. The data logger 1000 periodically logs data stored by the indication equipment. The indication equipment also accepts messages received from the remote stations and determines which of the several acceptable codes are present in the received words. This code would be representative of on or open, off or closed, in transit, alarm or isolation gate operated signals. After these words have been decoded by the decoder 800, indications are then transferred to storage and display units forming a portion of the indication equipment 900 and selected by the scan matrix 700. In addition to storing and displaying the status of all remote station supervisory indication, the indication equipment 900 also provides storage and display circuits for remote station point and station communication alarms. It contains all the visual alarm circuits. It is informed of each expected change in "unit" status as a result of the operation of control pushbuttons and anticipates the reporting of these changes during the automatic scan. It will alarm any unanticipated or unauthorized change.

The scan matrix 700 operates a selection relay in response to each address generated by the scan message unit 600. The selected relay provides contacts to select indication storage locations and indication circuit or an in line display which is to be updated and receive the information. The relay also selects the associated remote stations point and station communication alarm circuits so that if either of these faults occur, they will be properly stored and indicated.

The scan matrix also instructs the communication monitor if a selected relay represents the first point in a station scan and the relay can also be wired to affect a jump in the scan sequence from one address to another.

The scan message unit 600 is essentially a three decade counter which is incremented once for each step in the scan it presents two parallel outputs one output in code with the message selector for transmission by the transceiver and one in a complementary code to the scan matrix where it is used as previously described. Unless affected by the scan matrix through its jump logic arrangement or by the external manual control, the scan message unit 600 will count sequentially between 000 and 999. During the automatic scan it can be made to jump from one count to another, forwards or backwards by the scan matrix 700. Therefore, it is programmed by the circuit and will generate as many counts or addresses as are indication group points and data points in the system.

The control message circuit 400 provides the necessary equipment to generate a unique control message for each control message in the system. The control message unit generates one of a 1000 possible constant ratio coded messages in response to one of its associated pushbuttons. Coded messages are temporarily stored until such time as the scan can be conveniently interrupted. The control message unit 400 output is presented to the message selector 350 and storage of the message is controlled by the system control logic 500.

The control message unit 400 signals the system control logic 500 when a control message is to be transmitted and prepares the indication equipment 900 to receive and authorize unit status change during automatic scan. In addition, it starts a 30 minute timer within the flow rate monitor 1001 whenever an associated "unit on" control is initiated. Messages can be generated by the control message unit 400 in response to operation of manual switches.

The message selector 350 connects either the scan message unit 400 to the transceiver 300 as required by the mode (automatic scan or control) in which the system is operating at the moment. The message selector 350 is under control of the system control logic 500.

The system control logic 500 controls all master station equipment required for the acquisition and storage of data and indications for those required for control of units in the remote stations. The system and hence its logic has three modes of operation; automatic scan, point control and manual operation. The function of the logic during the three modes of operation is as follows.

During automatic scan the system control logic 500 increments the scan message unit 600 from one scan point address to another and instructs the transceiver 300 to transmit each address. When an errorless reply to each such address or interrogation is received, the system control logic provides gating signals to the decoders 800 to allow these circuits to accept the reply. In addition, the system control logic 500 provides a set signal which is used to update the in line display units and indication equipment 900 via the scan matrix 700. If a reply is received which contains a transmission error or if no reply is received, the logic only instructs the transceiver 300 to transmit. The result is a reinterrogation of the point. In the event an error free reply cannot be obtained from a point after three consecutive interrogations, it will bypass the point and inform the communication monitor 570 that a point communication fault has occurred.

During point control, the system control logic 500 is called upon to affect the transmission of a control message initiated by operation of a control pushbutton. As a result of this operation, the logic will allow the resultant control message to be stored in the control message unit 400 until such time as interrogation of a scan point is completed and until the control message has been transmitted.

The logic operates the message selector 350 to allow the control message unit 400 to access the transceiver 300 and instruct the transceiver to transmit the control message. In response to the subsequent control answer back reply from the remote station, the system control logic will provide an answer back signal to the indication equipment 900 to affect the lighting of the lamp associated with the control pushbutton operated. The logic automatically resumes automatic scan and releases both the control message from storage and the message selector 350.

During manual control the logic stops the automatic scan and allows control of the system by individual digit and key switches. In response to manually initiated interrogations, the logic will provide gating and set signals as during the automatic scan.

An additional function of this logic is to provide timer pulses to the flow rate monitor 1001 which are used to drive terminal logic when this unit is selected for operation by the scan matrix 700.

The communications monitor 570 counts the number of consecutive point communication fault signals presented to it by the system control logic 500. In addition to counting these faults, it relays them to the remote station point communication alarm circuit selected by the scan matrix 700. It counts these faults on a per station basis. If three consecutive point communication faults occur, the communication monitor 570 signals the station communication alarm circuit indication equipment selected by the scan matrix. Each time a successful reply signal is received from the system control logic 500, it relays the reply signal to the selected station communication alarm circuit as a station communication alarm release signal. The communication monitor 570 is informed by the scan matrix 700 each time a first point in a station is interrogated. This information is used to insure that only consecutive point faults within a station will be counted.

The flow rate monitor 1001 is provided at the master station for rate of change deviation detection of remote station flow readings. Sensitivity controls each monitor at the master station and provides local settings of deviation from ten to one hundred barrels in ten barrel increments. A rate of change timer is adjustable from zero to fifteen minutes and begins its time cycle upon a ten barrel change in flow. When a flow rate exceeds that set by the sensitivity control and timer, the respective rate of change indication is lighted and an alarm buzzer energized that form a portion of the flow rate monitor. During a station rate of change "upset" data from the "upset" station only is logged in red from the automatic typewriter of the data logger 1000. This data is logged in red for four consecutive scans after the "upset" condition occurs. At this time the "upset" logging ceases, unless the upset continues, and the logging program is restored by the logging timer that forms a portion of data logger 1000.

If upset conditions occur simultaneously at two or more stations, all of the stations under "upset" will then print out in red.

The flow rate monitor 1001 has a second adjustable timer with zero to thirty minute range to permit locking out transmission of rate of change alarms on the initiation of a start control of any unit at the stations where flows are monitored.

The data logger 1000 upon a contact closure from a zero to 120 minute timer or from a pushbutton requests storage information from a digital clock and from the in line indicators of the indication equipment 900. This binary information is changed to decimal form for typewriter input and supplemented with various numerical or letter identifications. The combined information is then presented character by character to an output writer for print-out. The data logger instructs the output writer to print-out all system information four times upon an alarm signal from the flow rate monitor 1001.

The logging typewriter that forms a portion of the data logger 1000 is an electric typewriter with carriage room for approximately 348 characters for logged information.

The carriage is 30 inches long. Logging is at the rate of about 10 to 12 characters per second. The logging programmer is preprogrammed for full 348 typewriter slots to permit rearranging data order and source of data. Only 236 slots are used initially.

The digital clock in the data logger 1000 producing time data storage is a model 2500 Cronilog unit. ADT company series 305 synchronous motor timer initiates the logging cycle. The time of this unit is adjustable from zero to 120 minutes.

Referring now to FIGURE 2, which discloses the remote station, the equipment of each remote station is typically represented by the layout of equipment shown in the remote station 1. For purposes of description, the equipment shown in remote station 1 will be described.

The tone receiver and tone transmitter 1101 and 1102 are identical to those described in the master station. Transceiver 1200 with two exceptions is identical to that used in the master station. Not only is error detection provided but serial constant ratio error detection is provided as well. The transceiver 1200 operates in conjunction with a constant ratio to decimal decoder 1300. The output of this decoder is used by the point selectors 1400. The point selector 1400 accepts the decimal output of the transceiver 1200, as well as the constant ratio binary output and compares it with its own decoder. If the outputs of both the transceiver's associated decoder 1300, and the point selection circuit do not check, no action will be taken as a result of the received message. This double decoding by separate circuits eliminates the possibility of false selection in a remote station as a result of failure in a single decoder.

The point selector 1400 selects information or initiates control functions in a remote station in response to messages received from the master station. It consists of three decoders, one for each digit in the message address. The decoders' outputs form a three dimensional matrix. The point selection devices are strapped to coordinates of the matrix to recognize addresses assigned to control data or indication devices within the station. The point selection device, when operated, may energize a Datex encoder, select a Varac encoder, energize alarm or unit status indication devices in the indication point access unit and encoder 1503 and select a control device through the point control access unit 1510. In all cases where data or indications are selected as in the above, the selected information is presented in parallel via the reply transfer circuit 1250 to the transceiver 1200 for serial transmission. All point selection devices are held operated by the control logic 1110 until the last word of the result of the reply transmission.

An indication point access unit and encoder, upon interrogation from the point selectors, will actuate status or alarm control 1502 to transmit their characteristic information and, in turn, encode that information for presentation to the reply transfer circuit 1250. The reply transfer circuit accepts parallel information from the indication point access unit and encoder 1503 and presents this information to the transceiver 1200 for transmission on an individual basis as selected. Control point access unit 1510, upon a control selection signal from the point selector 1400, will operate an end element relay which will present a contact closure to the field equipment 1501 which may consist of valves, pumps, motors, etc. These end element relays may be held operated and released through an interlocking contact from the above-mentioned equipment.

The control logic 1110 coordinates the efforts of the remote station units to establish a communications path between the remote and the master station and to affect the transmission of reply messages. To perform these functions, it accepts transmit signals from the point selector 1400, the indication point access unit encoder 1503, and operates an associated line relay. This line relay connects the output of the tone transmitter 1102 to the remote master station communication link for the period of reply transmission. The control logic 1110 relays the transmit signal to the transceiver 1200 to affect the reply transmission. The logic resets the transceiver 1200 to affect the reply transmission. The logic resets the transceiver if an incomplete message is received from the master station as a result of transmission noise. The logic may hold point selection devices in the point selector 1400 operated until the last word of the reply transmission to insure sufficient time is allowed to the transceiver 1200 to load itself with the reply information.

Extensive use is made throughout the instant system of reed relays. A reed relay assembly is essentially a cluster of magnetic reed elements controlled by coil windings with or without a permanent magnet. For brevity, the reed relay drivers are shown in the drawings of the system, but the reed relays themselves have not been included, only the associated contacts are shown. It is to be understood that operation of the relay driver will in turn operate the reed relay to operate the contacts shown.

Electronic logic circuitry, gate circuitry, clocks, counters, shift registers, encoders and timers used in the present system employ solid state components, conventional nor gates, inverters, flip-flop, clock, gated pulse amplifier and relay driver configurations.

MASTER STATION EQUIPMENT

The transceiver 300 can be described as being the heart of the master station. It has two modes of operation. These are the transmission mode in which a parallel to serial conversion is performed and the receive mode in which serial to parallel conversion is performed. The transceiver has a fifteen binary bit capacity. During transmit, it twice transmits fifteen bits as six bit words, adds start and stop bits to each word transmitted, transmits asynchronously and automatically reverts to its receive mode when finished. During receive it receives the six words and stores the last three after performing a serial parity check by comparing each bit of the first fifteen with each corresponding bit of the second. During the receiving mode it runs synchronously starting on each start and stopping on each stop bit. The transceiver further remembers if a serial parity error has occurred. The parallel loading time of the transceiver is less than two microseconds. The transceiver itself is adjustable between the rate of 100 and 500 baud. Operation above and below these limits can also be achieved by changes in the clock circuit.

The transceiver consists of: the receive and transmit logic which includes the clock and timing logic 303, word counter 304, pulse counter 305, transmit logic 306, receive logic 307 and transmit and receive common logic 308; it further consists of the serial input logic 309, parallel loading gates 330, shift register 320, the serial parity check logic 311 and error register 312. The transceiver normally functions as a receiver until it is instructed to transmit a message. After a transmission it reverts to its receive mode. As noted before, a message consists of fifteen binary information bits with each message being transmitted and received twice. In the transmit mode, the parallel loading gates 330, the shift register 320, the receive transmit logic 340 and the serial input logic 309 are required.

During transmit mode the message is loaded into the shift register 320 via the parallel loading gates 330. As the information bits are shifted one at a time out of the shift register and transmitted, they are reloaded into the register by the serial input logic 309. The received transmit logic provides a sufficient number of clock pulses to not only shift out the original, but also the regenerated message. The regenerated message is the same as the original so that the information is transmitted twice. A start bit is transmitted before and a stop bit is transmitted after each five information bits. These bits divide the original and regenerated messages into three five bit words. These bits are also used to synchronize the transceiver in a remote station being used as a receiver at this time. Therefore, each transmission consists of two identical messages or six words.

During receive all of the above-mentioned positions of the transceiver 300 are used with the exception of the parallel loading gates 330. When a transmission is to be received, the clock which is a portion of 303 was used to shift information out of the shift register 320. During transmit it is now used to shift serial information into the shift register. This clock is started by each start bit and stopped during each stop bit received. Between each start and stop bit, the clock pulses are used to shift status of the information bits into the shift register 320 via the serial input logic 309. Each bit's status is shifted into the register not as it is received but at approximately its center. Since the clock is started and stopped six times during each transmission, a greater variation of clock frequency is allowable. Only the information bits are shifted into the register. The stop and start bits are not stored.

After the original message has been received and stored, the serial parity check logic 311 compares each bit of the original message as it is shifted out of the register with its corresponding bit in the regenerated message; as it is shifted into the register, if any comparison does not check, the serial parity check logic 311 will set the error register 312. When the complete transmission has been received, the regenerated message will be present in the shift register.

The transceiver 300 signals associated circuits when it is in its transmit mode of operation, when an error has been detected, when its logic is in its steady state, when the last word of the transmission is being transmitted, and when the last word of a transmission is being received.

Each of the units forming the transceiver will now be discussed in more detail. The receive transmit logic 340 provides the necessary timing pulses and support logic for the remaining units of the transceiver. It is divided into seven functional portions. These are the clock and timing logic 303, the clock pulse counter 305, the word counter 304, the transmit and receive common logic 308, the transmit only logic 306, the receive only logic 307 and mode register 310.

The clock and timing logic 303 provides clock pulses, shift pulses and word pulses. It consists of a clock circuit and three gated pulse amplifiers. Seven clock pulses are generated for each word transmitted or received; one for each start, stop and intelligence bit. A gated pulse amplifier combines the output of the clock and selected outputs of the clock pulse counter produce five shift pulses for each word. These pulses are primarily used to shift words into or out of the shift register 320. A gated pulse amplifier combines the output of the clock and selected outputs of the clock pulse counter to produce a word pulse coincident with the seventh clock pulse for each word. These pulses are primarily used to increment the word counter. The clock pulses, in addition to being used to produce shift and word pulses, increment the clock pulse counter, reset the shift register 320, error register 312 and load the shift register 320. The clock is gated and as such will run when any of its inputs is set to a "state one." When first enabled, it will produce a clock pulse after one half a bit time and at intervals of one bit thereafter until disabled. A bit time is defined as the interval of a transmitted bit at the given rate.

Clock pulse counter 305 is used to determine which of the seven clock pulses per word are to be used as shift pulses or as a word pulse. In addition, it is used to enable various gates whose functions are required for each word, for specific words or during steady state. Those gates whose functions are required for specific words or during steady state also require selected outputs of the word counter 304. The clock pulse counter consists of four flip-flops designated BA through BD and associated gate circuits. It is basically a two end counter and if not influenced by external logic would count in the usual manner. During transmit, the counter counts the seven clock pulses for each word in the usual manner. It is only in its reset or all zero states before and after a transmission. During receive the clock pulse counter 305 counts differently than during the transmit mode. This count is effected because during receive the clock will run after receipt of the start bit when the counter is in its all zero state and will continue to run when the counter flip-flops are set. Therefore, it will stop when the seventh clock pulse is counted which is during a stop bit. An associated gate circuit prevents application of the DC set and reset pulses to the initial flip-flop during the count of seven in the transmit mode when the next clock pulse is to force the count to one and not reset.

The word counter 304 remembers which word is being transmitted or received. It is basically a 2N counter and consists of flip-flops designated AA through AD which advance normally in the usual manner. The word counter 304 is used to enable various gates whose functions are required either during steady state or during receive or transmission of specific words. The counter is incremented by the first clock pulse to occur and thereafter by each word pulse.

The mode register 310 consists of a single flip-flop. It is used to enable transmit or receive only logic functions. It is set by external circuitry when a transmission is required and is reset when the last word has been transmitted. Its steady state is reset and hence the normal mode of the transceiver is receive.

The transmit and receive common logic 308 is used during both receive and transmit and consists of NOR gates with associated level drivers. Three gates are paralleled and their inputs are connected to all of the normal "one" outputs of the word and clock pulse counters. Their common output is a "one" when both counters are reset and hence when the transceiver 300 is in the steady state. Additional gates are used to enable the D.C. resets of the shift register so that when the first clock pulse occurs, the shift register will be reset. This is a necessary function during transmit since the register must be clear before loading. The reset occurs during receive also but is redundant. Another gate is enabled when the fifth bit of word is being transmitted or received and is used to write a stop bit into the shift register buffer 324 during transmit. The stop bits are written during receive also, but they are redundant.

The transmit only logic consists of eight gates. The first is used to enable the parallel loading gates 330 after the shift register 320 has been reset. The second is used to write a start bit into the shift register buffer 324 before the shifting out of each word transmitted. The third gate is used to force the clock pulse counter 305 to skip its all "zero" state during the transmit mode. The fourth gate is used to reset the mode register 310 after the last word of the transmission. The fifth gate circuit and an associated inverter are used to key the tone transmitter 301. When the output of the inverter is a "one" a mark frequency will be generated by the tone transmitter, and when the output is a "zero" a space frequency will be generated. Mark is the steady state condition while space is the deviation from steady state. All "ones" in a message are transmitted as marks, and zeros are transmitted as spaces. During receive the output of the inverter is made to be a "one" or mark by disabling of its associated gate by the mode register 310. When the receiver is switched to transmit the mark condition is maintained by the second gate of the six gates until the first start bit is written into the shift register buffer 324. Thereafter and until the six words have been transmitted the condition of the shift register buffer 324 will determine what condition, mark or space will be presented to the tone transmitter. A second inverter when its output is "zero" signals external circuitry when the last word of a message is being transmitted.

The receive only logic 307 consists of two gate circuits. The first gate is used to force the clock pulse counter 305 to skip one of its gated conditions during receive. The second gate is used to signal external circuitry when the last word of the message is being received.

The serial input logic 309 allows either the tone receiver 302, during receive or the shift register 320 output, during transmit to serially load the input of the shift register, and to drive the serial parity check logic 311. The serial input logic will also gate the output of the tone receiver 302 during receive to the clock so that the clock may be initially enabled during each receive start bit.

During receive operation of the serial input logic 309 starts as follows. The mode register 310 is in its "reset" condition. The eight gates that are included in the mode register are enabled. The third and fourth gates are disabled. The first inverter and a fifth gate present the complement and the true condition of the tone receiver's output to the first two gates. These gates in turn drive a sixth and seventh gate which are in turn inverted by an eighth gate and a level driver. The end result is that in the receive mode the output state of the eighth gate will be the same as that of the tone receiver and that of the level driver will be its complement. For example, if the tone receiver's output is a mark or "one" the output of the eighth gate will be a "one" while the output of the level driver will be a "zero." The second gate presents the complement of the serial input to the clock so that it may be started by start bits during the receive function. During the transmit mode the serial input logic 309 operates much the same as during receive. The second and third gates are disabled by the mode register 310 while the fourth and fifth gates are partially enabled. The end result is that the output of the last gate will be the same as the normal "one" output of the first unit flip-flop of the shift register and the output of the level driver will be the same as the normal "zero" output of the same flip-flop.

The parallel loading gates 330 actually consist of fifteen gates, five of which are each represented by gates 331, 332 and 333, one for each of the fifteen stages of the shift register 320. The complement of the bits to be transmitted is presented to these gates by external circuitry. The gates when enabled, allow the true message to be written into the shift register 320.

The shift register 320 provides storage for message bits during transmit and receive. It is conventional in design and consists of sixteen flip-flops. During transmit the message bits are initially loaded into flip-flops 1 through 15 by the parallel loading gates 330. They are shifted one at a time into the buffer stage 324 which is the sixteenth flip-flop by the application of shift pulses. The buffer stage determines what state, mark or space, will be presented to the tone transmitter 301 during transmit. The register buffer 324 is set when a mark is to be transmitted and reset when a space is to be transmitted. The receive transmit logic 340 inserts stop and start bits into a transmission by setting and resetting of the buffer 324. As each message bit is shifted into the buffer, it is also shifted into the first flip-flop to the serial input logic. By providing a sufficient number of shift pulses the original bits loaded in parallel into the register by the parallel loading gates are serially reloaded into the register 324 and transmitted a second time. Transmission of the second message causes the shift register 320 to once again be reloaded through the serial input logic therefore, the transceiver has the message which was twice transmitted, stored in the shift register after a complete transmission. This message will remain as long as the transceiver remains in its steady state. During receive the message bits presented to the serial input logic by the tone receiver 302 are serially shifted into the shift register. The first message received is "pushed" out of the register by the second message. The second message is stored so long as the transceiver remains in the steady state.

The serial parity check logic 311 sets the associated error register 312 if corresponding bits of the first and second messages are not the same. Message bits, as they are received by the tone receiver 302 are shifted in the shift register 320 via the serial input logic 309 when its pulses occur. These bits progress down the register from the first flip-flop. After the first message has been received, bits 1 through 15 of that message will be located in the fifteenth to first flip-flops respectively. As bit 1 of the second message is shifted into the first flip-flop, the first bit of the first message is shifted out of the fifteenth flip-flop. In the same manner, subsequent bits of the second message force its corresponding bit in the first message out of the fifteenth flip-flop. Prior to the application of a shift pulse, the outputs of the serial input logic 309 and of the fifteenth flip-flop reflect the condition of corresponding bits of the first and second message. The serial parity check logic 311 consists of three gates. The first gate is enabled after the first message has been received and when the other two gates are disabled. If these conditions are true its "one" output and a shift pulse will set the error register 312. The gate is enabled when both a space is received and when the fifteenth flip-flop of the shift register has a space stored. The third gate is enabled when both a mark is received and a mark is stored in fifteenth flip-flop. Neither the second or third gates will be enabled, therefore, the first gate will be disabled when corresponding bits are both mark and space.

The error register 312 is used to provide storage for a detected error. It is set by the serial parity check logic 311. It is reset at the beginning of a new transmission during receive or transmit. Its "one" output is used to signal external circuitry that the received information contains an error. In summary, during transmit, the complement of the message to be transmitted is presented to the parallel loading gates 330 and the mode register 310 is set. The clock 303 is then enabled and 43 clock pulses are generated. The first is used to clear the shift register and the second is used to load the register and write the first start bit in the buffer 324 for transmission. The subsequent clock pulses are used to shift or write information into the buffer for transmission.

A message is serially reloaded into the register 324 as it is transmitted and each message is transmitted twice. In a receive mode the first start bit that is received will start the clock via the serial input logic 309. The first clock pulse will occur and the center of the start bit will reset the shift register 320 and error register 312 and set the word counter 304 to its first word state. In addition, it will increment the clock pulse counter so it will no longer be in its steady state or reset condition. The clock pulse counter will then keep the clock enabled for six additional clock pulses. Clock pulses 2 to 6 will occur during the center of bits 1 through 5 of the first word. These pulses are used to shift the bits into the shift register 320 via the serial input logic 309. The setting of the clock pulse which occurs in the center of the first stop bit resets the clock pulse counter and affects an increment of the word counter 304 to its second word state. Since the clock pulse counter is reset the clock is disabled. Thus the units digit of the first message is stored. The start bit of the second word starts the clock again and the first clock pulse of the second word increments the clock pulse counter 305. The clock pulse counter 305 will then keep the clock enabled for six additional clock pulses as before. Hence the units and tens digits of the first message are then stored in the shift register 320. Effectively, the second message pushes the first out of the shift register. After the first message was received, the serial parity check logic 311 compared each bit of the first message with each bit of the second message. The transceiver signals external circuitry when in its receive mode, steady state and no error detected. If all of these conditions are simultaneouslp true, when the parallel output of the shift register may be accepted by external circuitry.

Figure 3:
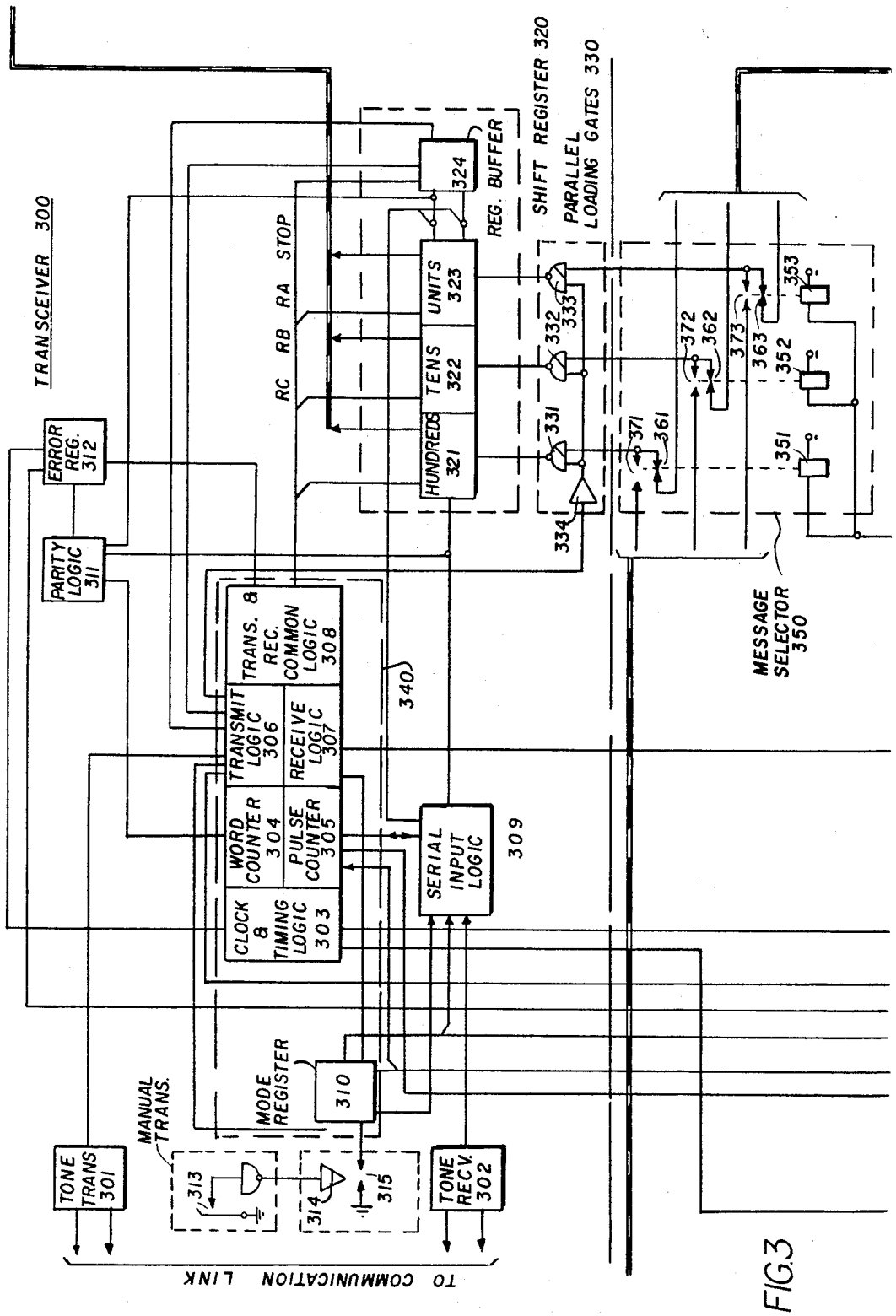
FIGURES 3 to 10 are to be arranged.

The message selector 350 allows either the scan message unit 600 or the control message unit 400 to provide parallel information to the master station transceiver 300. The message selector 350 consists of relays 351, 352 and 353 with their associated contacts. In the practical embodiment of the instant system the constant ratio outputs of the scan message unit are connected to normally closed contacts 361, 362 and 363 respectively. Actually the contacts shown in FIGURE 3 are each representative of five sets of contacts to provide full coded output of the scan or control message units. The constant ratio outputs of the control message unit 400 are connected to contacts 371, 372 and 373 respectively, or the normally open contacts of the message selector relays. The outputs of all contacts are connected to the inputs of parallel loading gates 330 and transceiver 300. Since relays 351, 352 and 353 are normally deenergized scan messages from the scan message unit 600 are normally presented to transceiver 300.

When a control message is to be transmitted, the mode register and logic 520 of system control logic 500 will operate either relay driver 526 to close a ground through at contacts 536 or operate relay driver 527 to extend the ground at contacts 537 through to the three relays 351, 352 and 353 in parallel. This operation is in response to the initiation of a control message from control message unit 400. These relays will be held until the control message has been transmitted by maintaining ground on the relays.

Figure 6:
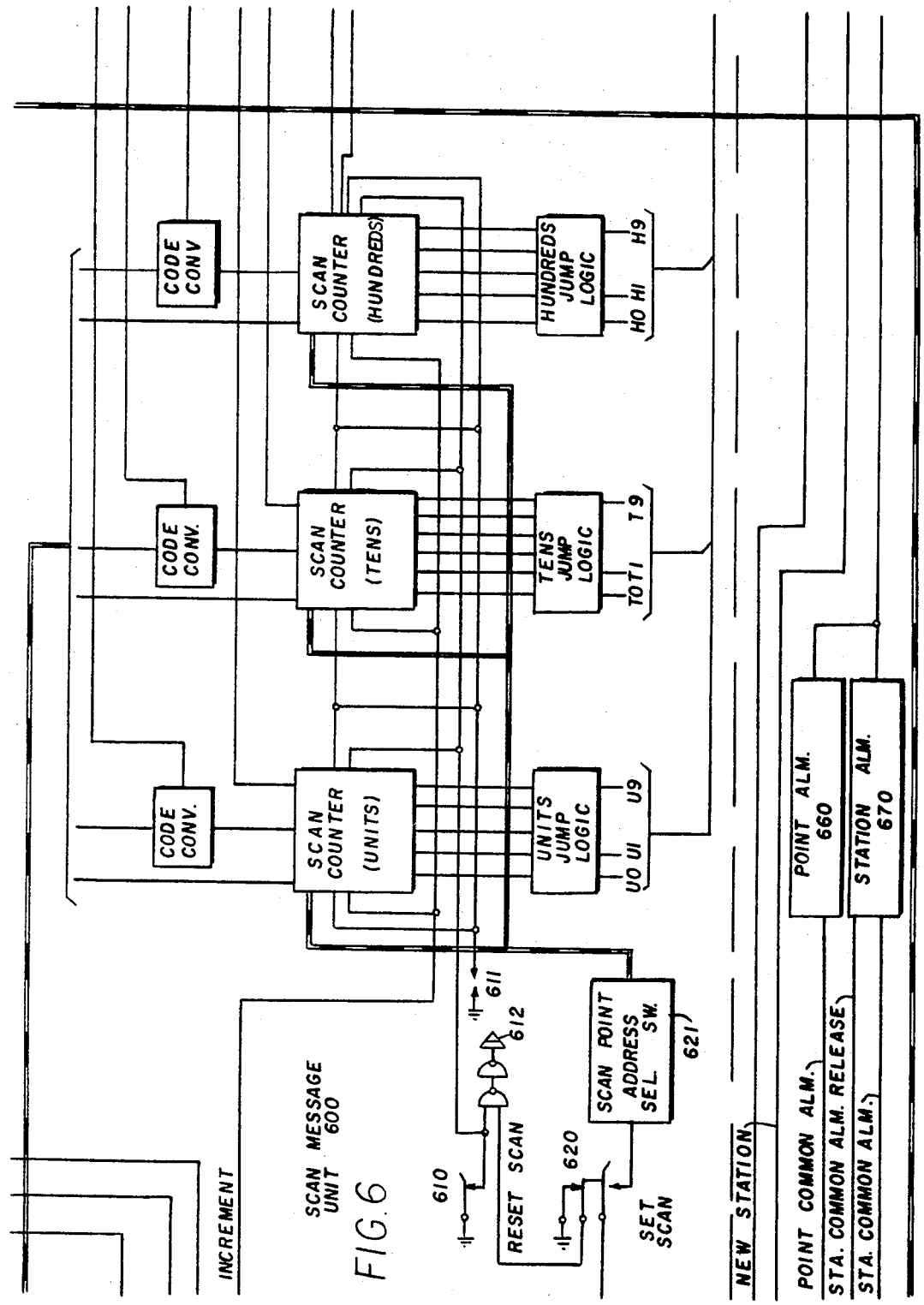
Figure 7:
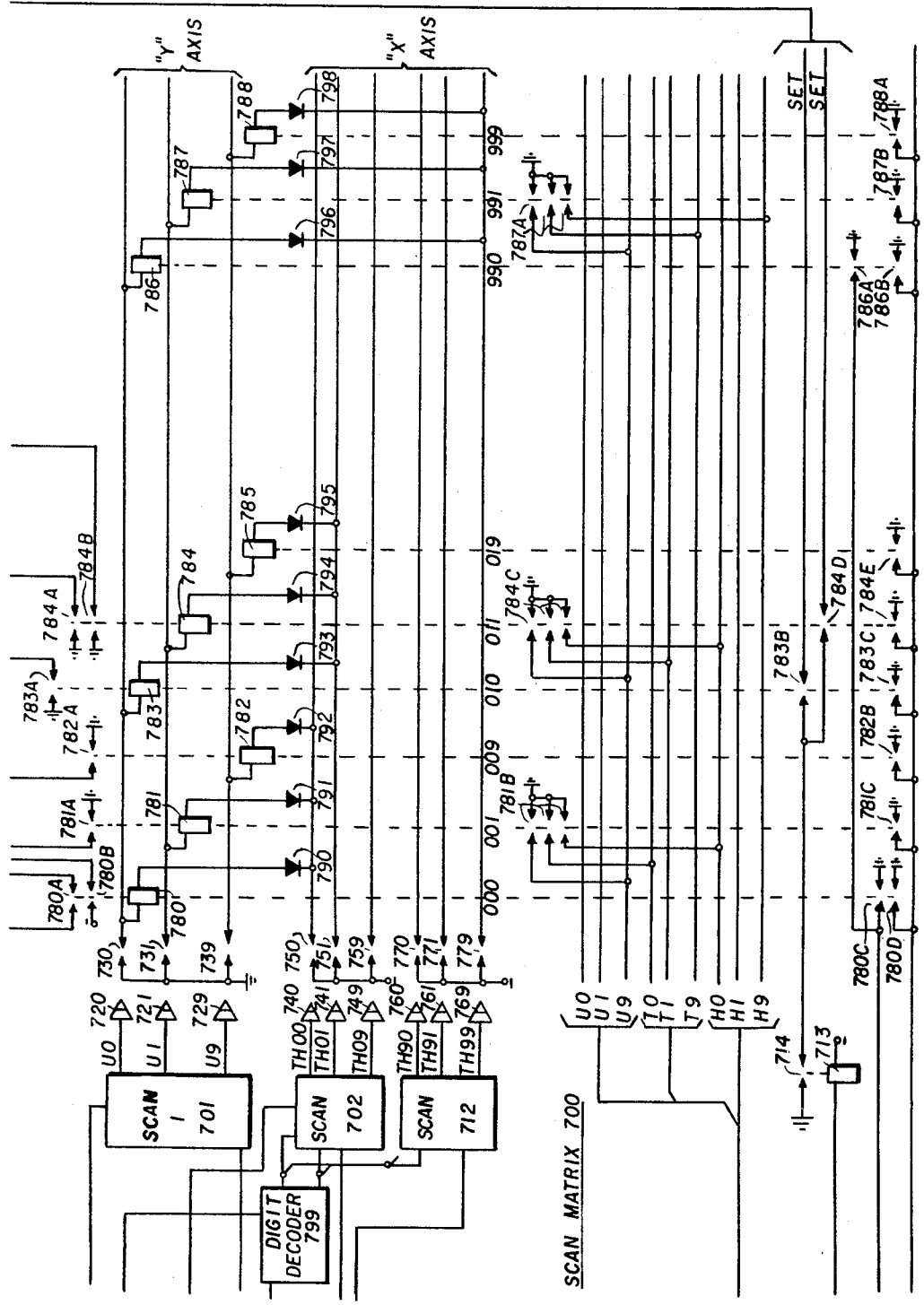
Figure 8:
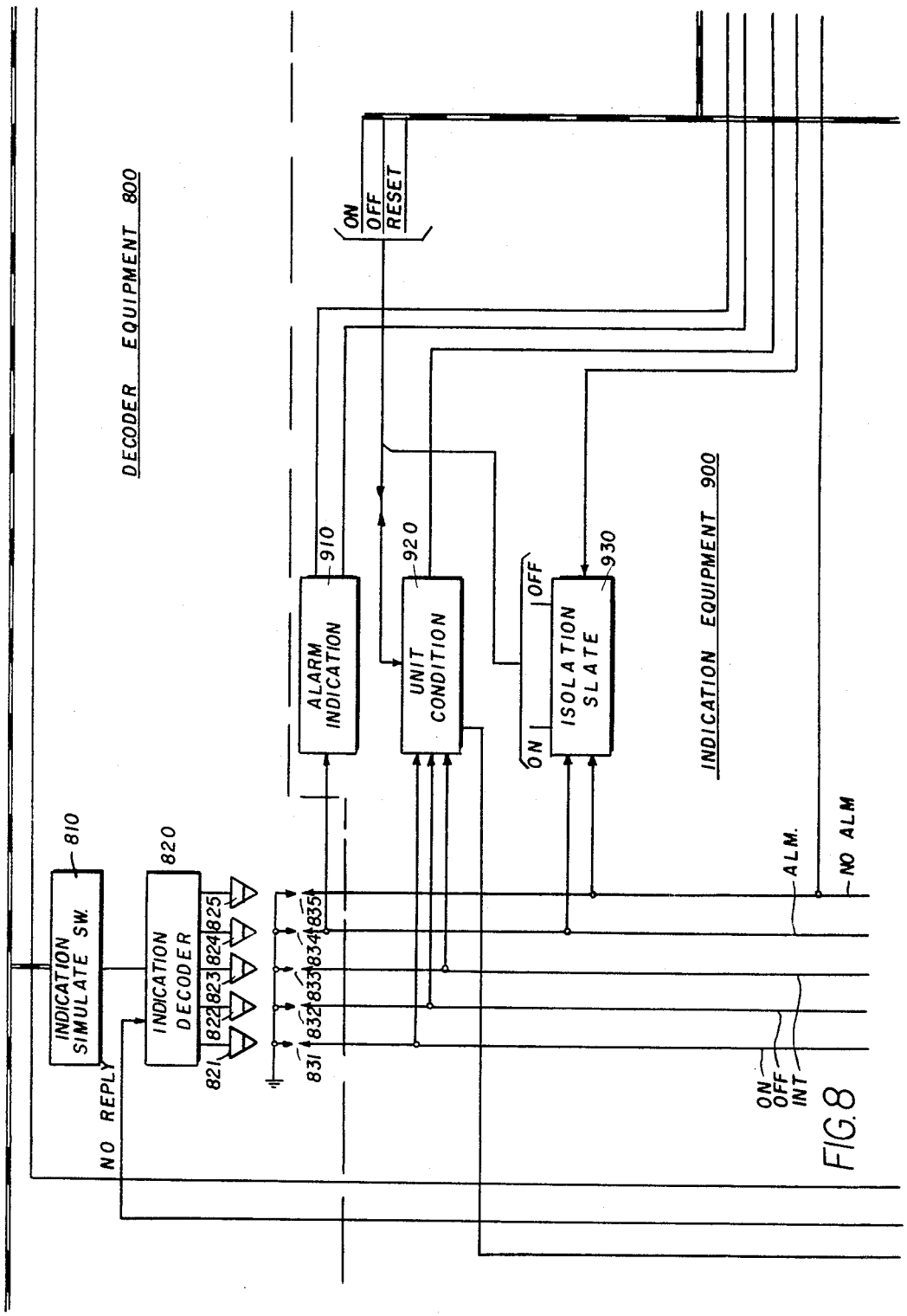
Figure 9:
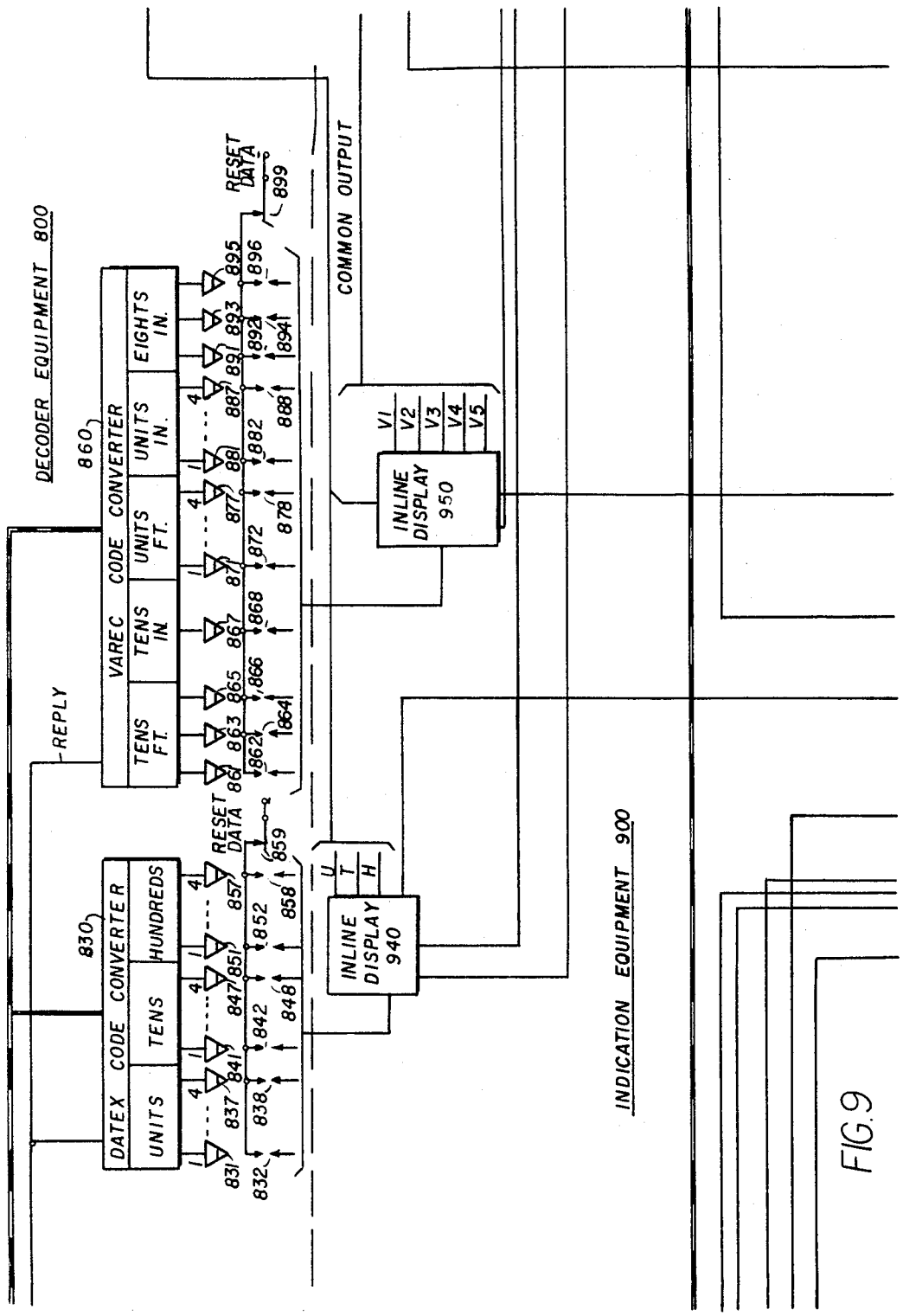
Figure 10:
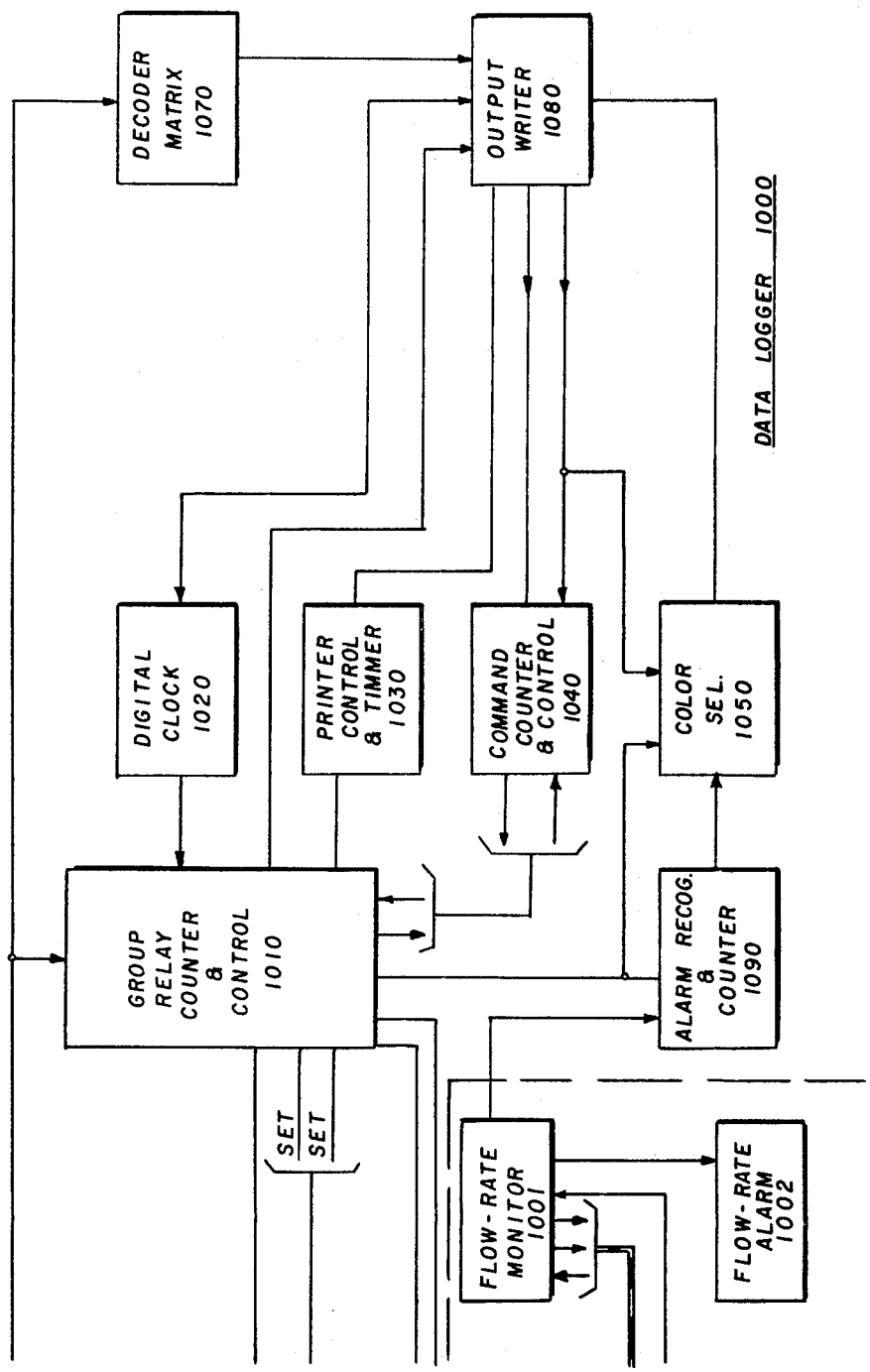
Figure 11:
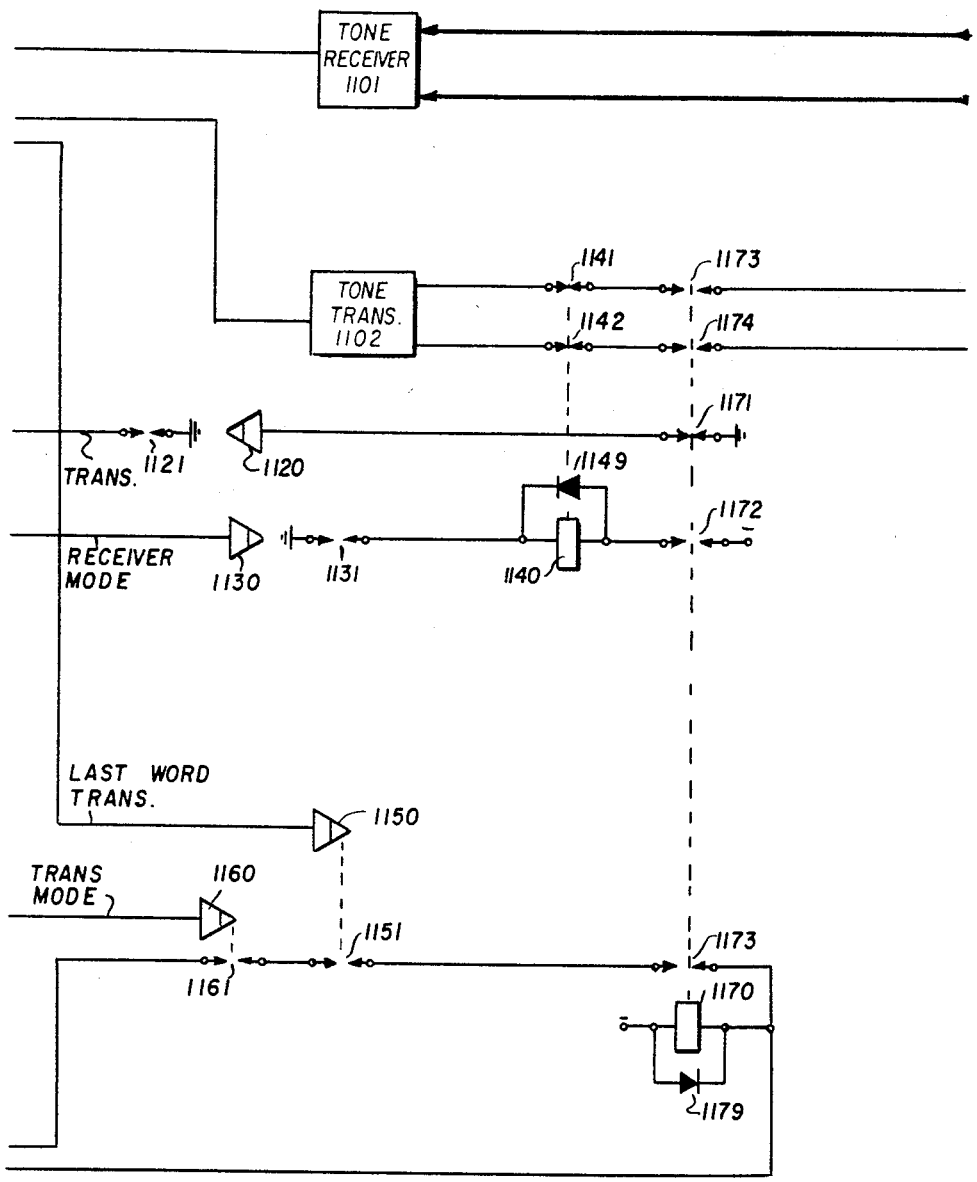
FIGURES 11 to 15 are to be arranged.
Figure 12:
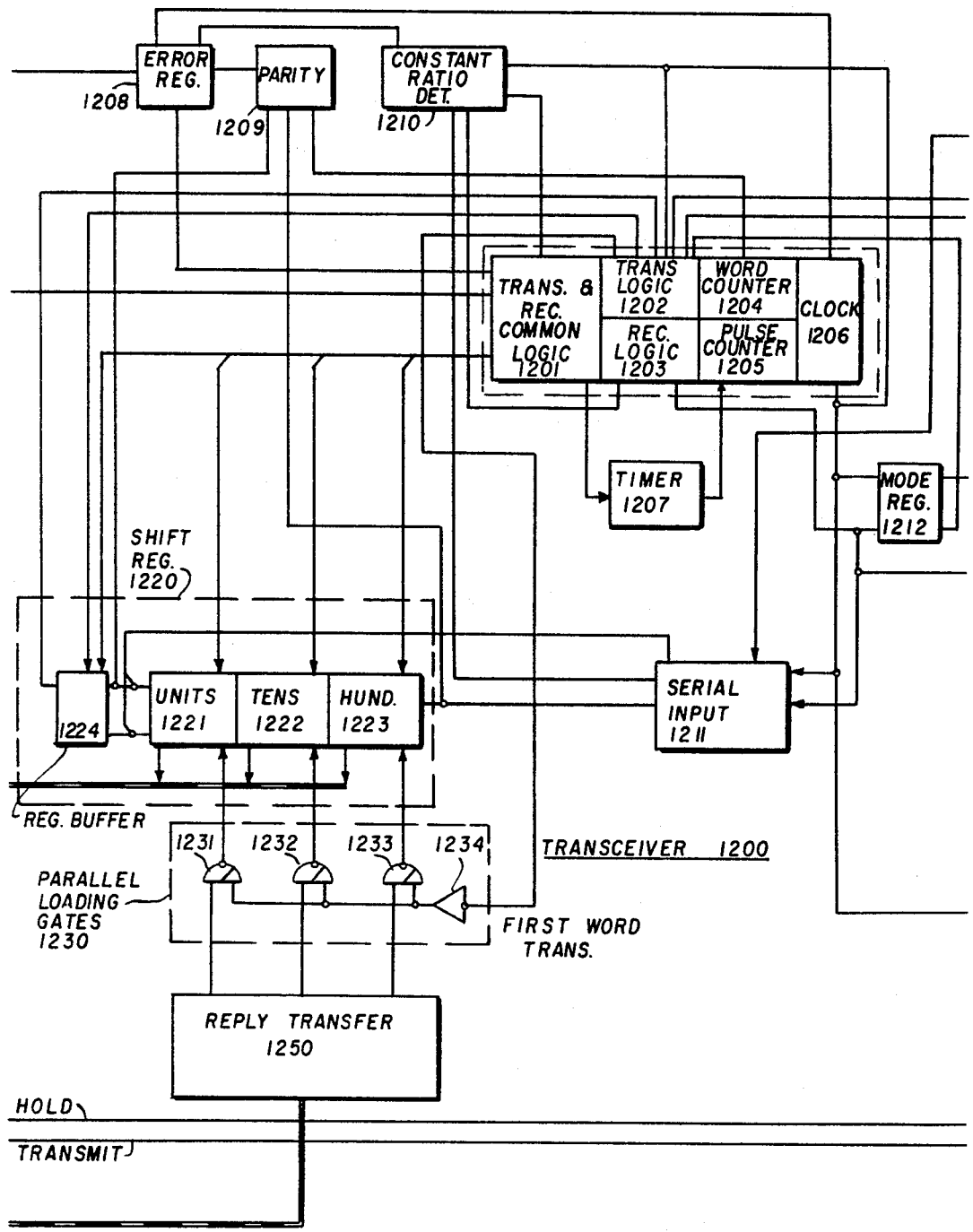
Figure 13:
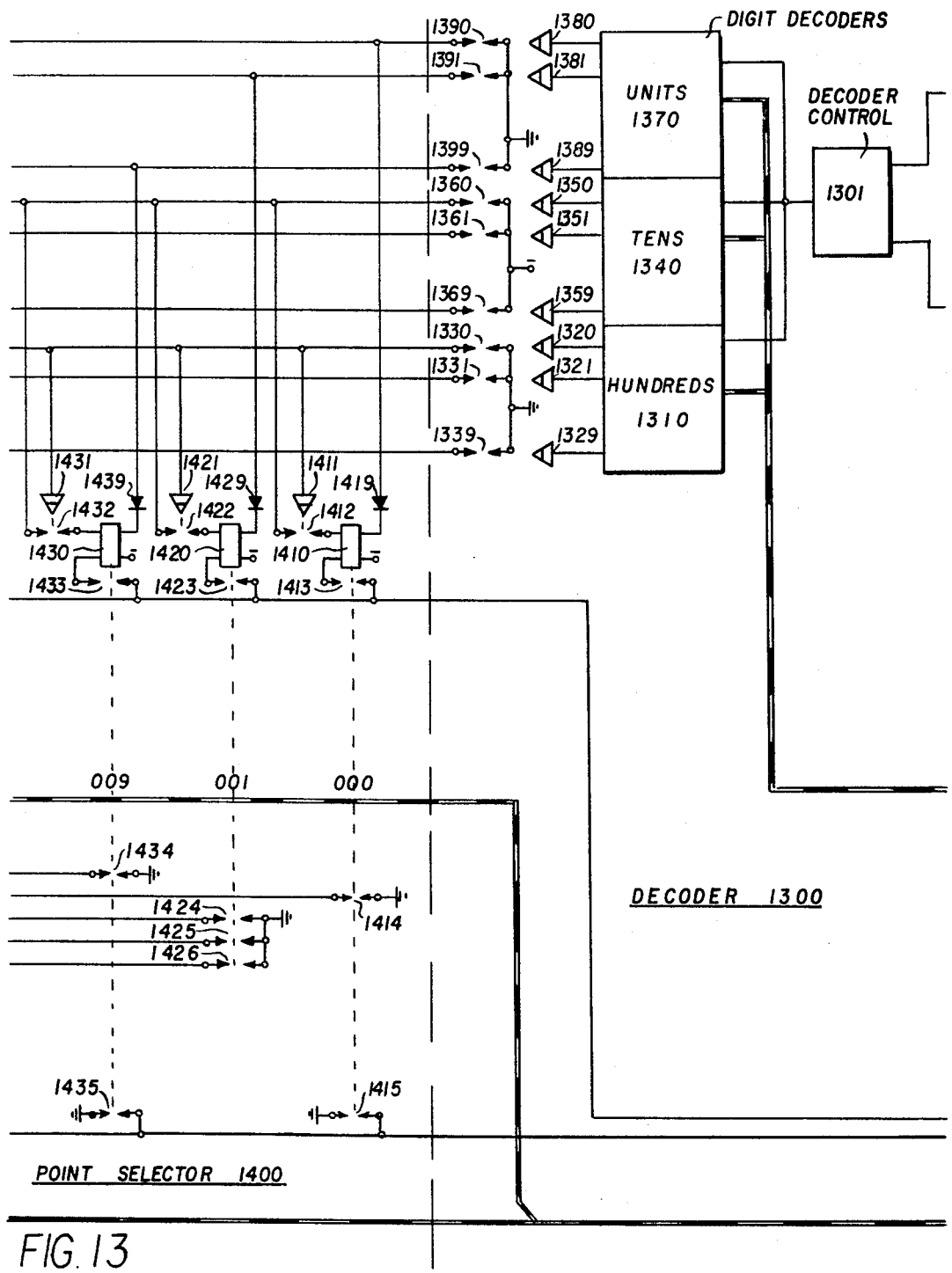
Figure 14:
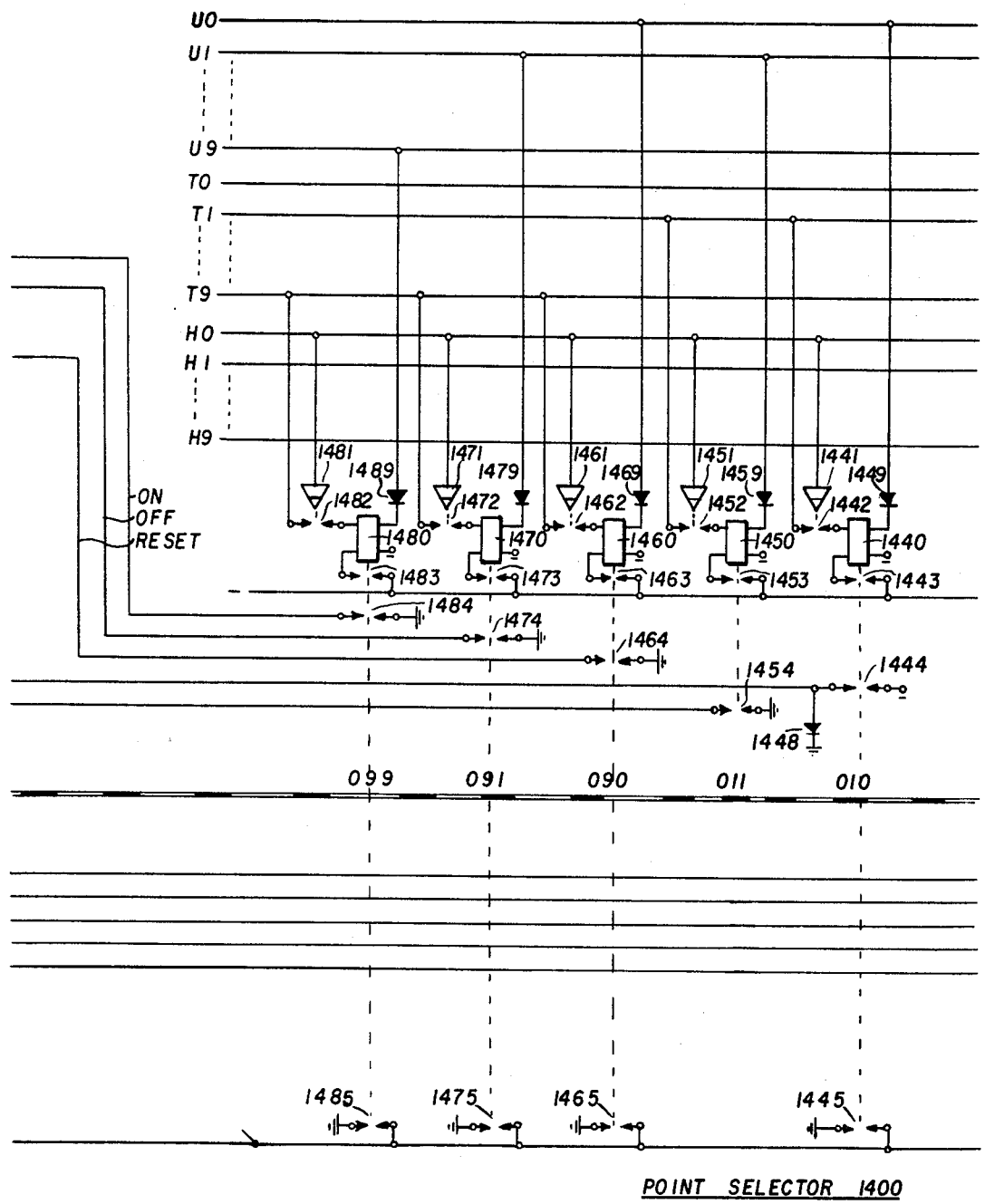
Figure 15:
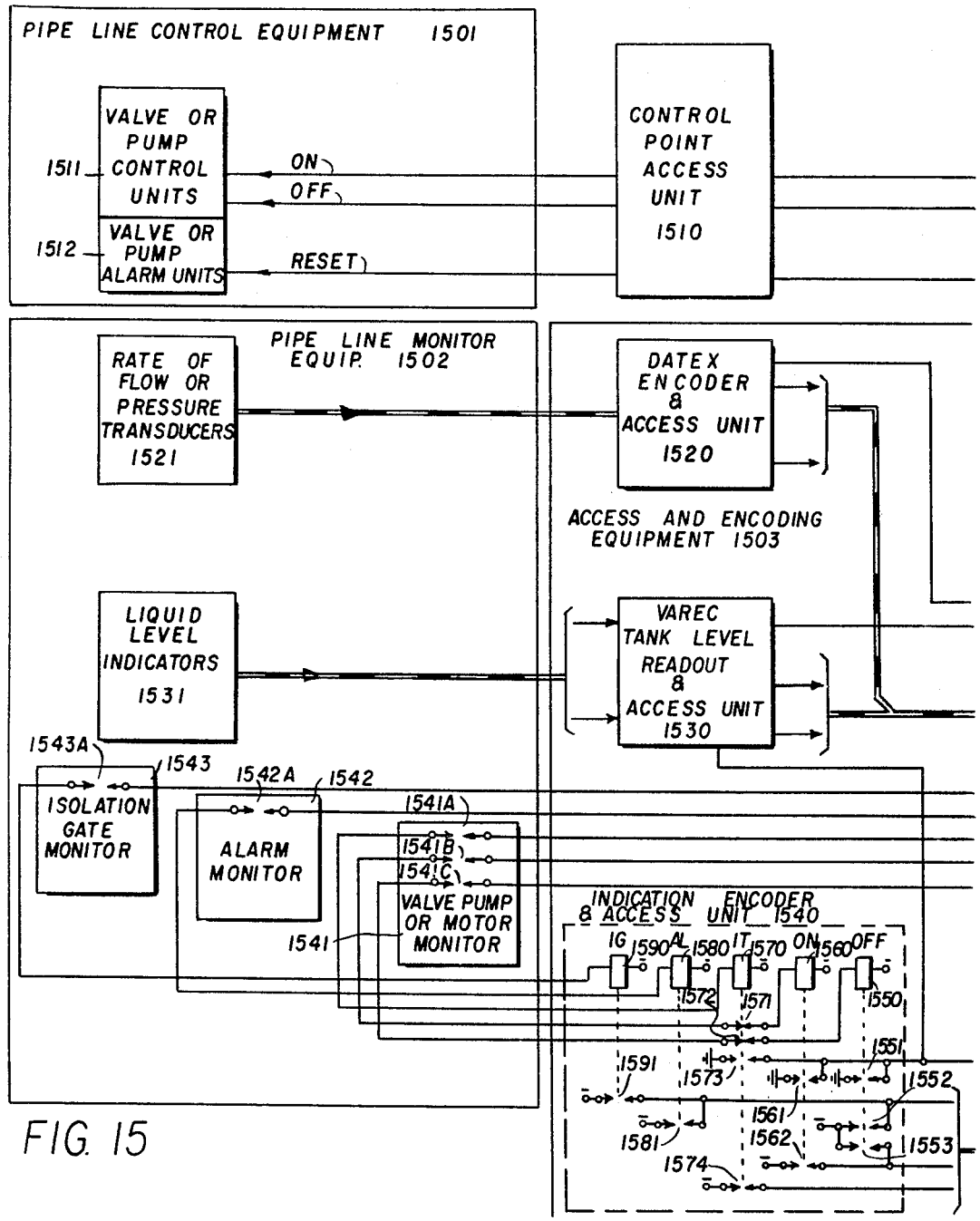

The scan message unit 600 (FIG. 6) is capable of generating 1,000 addresses, 000 through 999 in sequence utilizing a 7-4-2-1-0 constant ratio code for transmission to remote stations. These codes are generated to control the scan matrix 700. The scan message unit may be programmed to jump a point or group of points in the normal count sequence. Also the scan message unit 600 may be loaded with any address from 000 through 999 from an external source. The system of which the scan message unit is a portion is capable of interrogating and controlling 1,000 points. Each of these points is identifiable by a three digit decimal address. The scan message unit generates the necessary addresses for the points required in the system.

The scan message unit 600 is made up of three basic components, the scan counter, the jump logic and the code converter. The scan counter is comprised of three separate counters, the units counter 632, tens counter 642 and hundreds counter 652 (each including three associated count logic), and two gated pulse amplifiers. One of the gated pulse amplifiers is used to distribute clock pulses to the tens and hundreds counters and the count logic is used to force the counter to operate in the desired mode. Each counter consists of four flip-flops and eight NOR gates. Each counter utilizes a 7-4-2-1 weighted code and is designed to count from 0 through 9. The units counter is incremented with a clock pulse from the system control logic 500. The same clock pulse will index the tens counter if a 9 has been registered in the units counter and will index the hundreds counter if a 9 has been registered in both the tens counter and the units counter. A jump logic consisting of units jump logic 631, tens jump logic 641 and hundreds jump logic 651 performs a decimal to 7-4-2-1 conversion. A three wire input (one per digit) is fed from the scan matrix 700 and is converted into a twelve wire output. This output is then fed to a reset lead of each stage in the scan counter. When the jump logic is activated that fact is recognized and three gate circuits (one per digit) are enabled which inhibit the count logic in its associated group. The gates which perform this function in the tens and hundred portion of the jump logic will enable gates in their associated counters. Enabling of these gates permits the simultaneous indexing of all three digits in the scan counter.

The code converters 634, 644 and 654 convert the 7-4-2-1 output of the associated scan counter stages to a 7-4-2-1-0 complement code. Both codes are shown below for counts 0 through 9.

| Count | 7-4-2-1 Code | 7-4-2-1-0 Code |
|---|---|---|
| 0 | 0000 | 00111 |
| 1 | 0001 | 11100 |
| 2 | 0010 | 11010 |
| 3 | 0011 | 11001 |
| 4 | 0100 | 10110 |
| 5 | 0101 | 10101 |
| 6 | 0110 | 10011 |
| 7 | 1000 | 01110 |
| 8 | 1001 | 01101 |
| 9 | 1010 | 01011 |

In general the scan message unit 600 has two modes of operation: (1) an automatic scan mode in which the counts are generated automatically and in sequence and (2) a manual mode in which the counts are generated with digit switches and in any desired order. Assuming the initial condition of the scan counter is in the reset condition, the first count generated in a normal sequence would be 001. The first digit would be a "1" written into the units digits scan counter. The tens and hundreds digits will remain unchanged or in the zero state because the clock pulse would not be allowed to increment the tens or hundreds counters. Other counts would be handled in the normal sequence in a similar fashion with the tens and hundreds counters advancing on the basis of an incremental clock pulse each time a 9 is registered in the units or tens counters. If the jump logic is preprogrammed to skip a group of points, a contact group, for example 781B in the scan matrix 700, will cause a jump from the point address 001 to 009 by placing ground on the appropriate leads into the units, tens and hundreds jump logic 631, 641 and 651 respectively and at the moment that point 001 is being interrogated, the ground returned over the strapped contacts will supply the necessary indications to the jump logic circuitry to force the counters to the 009 count for the next selected address. Automatic scan operation may be interrupted and replaced by manual scan operation any time in the scan by inhibiting the increment pulse. This is done when an inhibiting pulse is received from the system control logic. The scan counter is then reset by an A.C. clock pulse via the system control logic 400 with a D.C. pulse applied at key 610 to apply ground at contacts 611 to the scanners.

Assuming it is desired to stop the automatic scan and enter a count of 010 in the scan counter, the following sequence would take place. A stop scan key 529 would be depressed. This will inhibit the increment pulse to the scan counter. Then depression of the reset scan key 610 will operate relay driver 612 to close relay contact 611 to supply the necessary D.C. reset pulse. This action will enable the necessary internal gate circuitry of the scanners so that when the A.C. clock pulse is presented to the scanners, the entire scan counter would be reset to 0. The count 010 is then indexed on the scan point address selector switch 621. The digit switches of this unit have a 12 wire 7-4-2-1 coded output which will then be fed to scanners 633, 643 and 653. The outputs of the digit switches in the scan point address selector switch will then enable the proper points in the scanners in accordance with the selected 010 address. The final action is depression of the set scan key 620 which will generate the necessary A.C. clock pulse and set the internal flip-flops of the scanners to produce the desired output.

Figure 4:
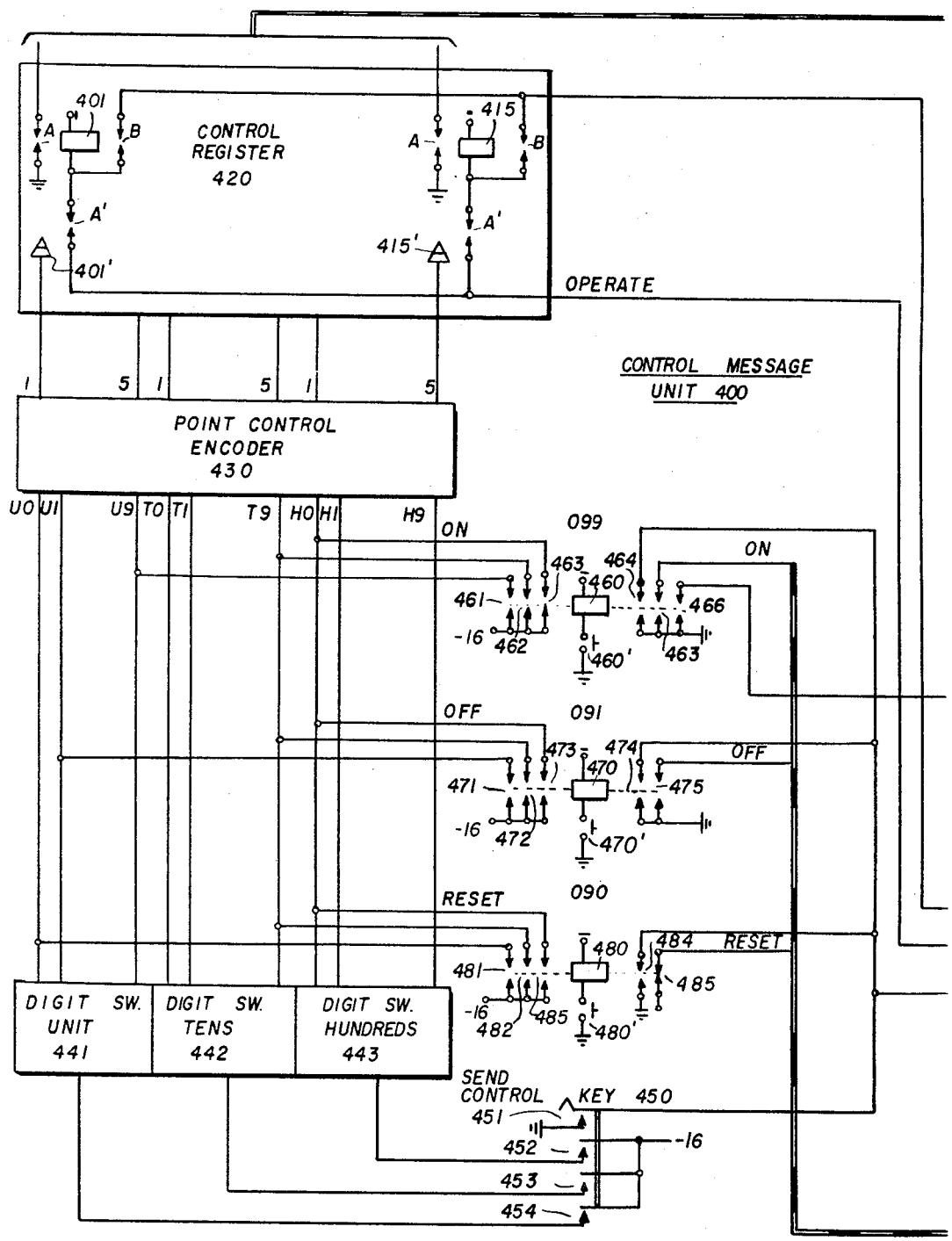
Figure 5:
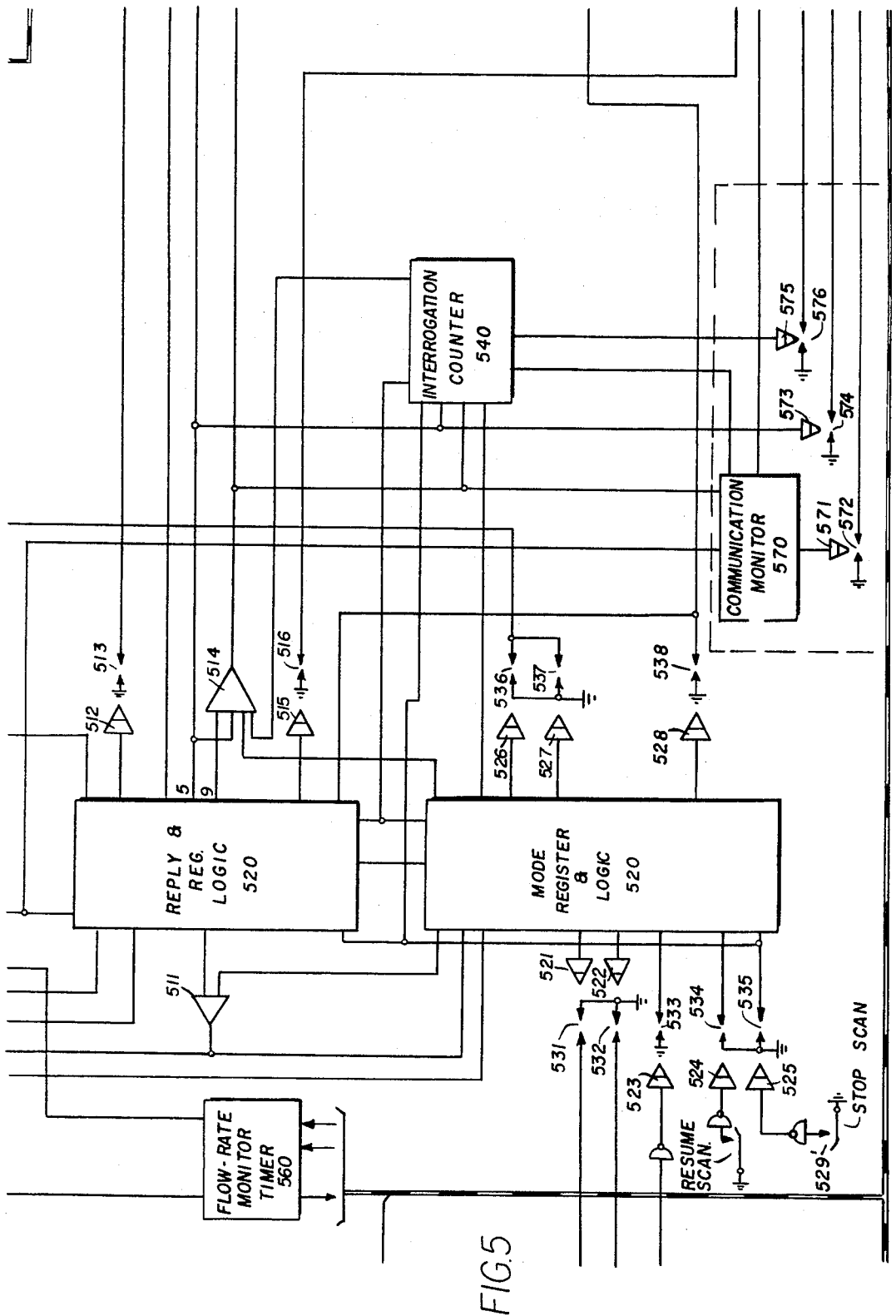

The control message circuit 400 (FIG. 4) provides means for generation of 7-4-2-1-0 complement constant ratio point control messages. It is capable of generating 1,000 point control messages and provides an intermediate storage point for all control messages.

The control message unit 400 consists of the on, off and reset controls 460, 470 and 480, point control and encoder 430, control driver and register 420 and the digit switches 441, 442 and 443. Each of the control circuits using control circuit 460 (on) as an example consists of a push button 460', an associated relay 460 and the required relay contacts. These are used to select the point control codes to be generated by the point control encoder 430, and to signal the system control logic 500 when a control message has been generated. In a given application of the control message unit 400, it is conceivable that not all types of controls will be used; however, for descriptive purposes each one has been included in this embodiment. Control unit 460 which may be used to turn on a valve in a pipe line control system where flow rate monitoring is employed at the master station and when an answer back control message performs the lighting of a lamp associated with the control push-button. When operated, this lamp will also signal a flow rate monitor associated with the pump station to indicate that an authorized change in flow is to be expected. In addition, it will signal the indication circuit to identify the control. Unit 470 is used to turn a pump off or to close a valve in a pipe line control system in which the answer back to a control message requires the lighting of a lamp associated control pushbutton. When used, this will also signal the identification circuit to identify the pump control or the valve open or the valve closed. The reset figure 480 is used to reset alarm storage devices associated with a pump in the remote station. When used it will also signal the indication circuit to affect release and restore control function associated with the pump.

The point control encoder 430 is used to encode incoming information received as contact closures on its common decimal inputs U0 to U9, T0 to T9 and H0 to H9, into three digits of the 7–4–2–1–0 complement code. The point control encoder consists of three portions. The units, tens and hundreds encoders. Each encoder has ten decimal inputs. Each decimal input is connected to two NOR gates. The five outputs of each encoder are normally all "1"; —16 volts placed on any of the control circuits will cause the outputs of its two associated gates to become zeros in accordance with the appropriated coding. Therefore, the outputs of the point control encoder effectively provide the coded inputs to the register driver 420.

The register driver 420 accepts the outputs of the point control encoder 430. If no —16 volt inputs to the encoder are present, its outputs will all be 1 and the associated relay drivers 401 to 415 will not be operated. If the encoder presents any zero outputs, the relay drivers associated therewith will operate and in turn cause the operation of the associated control relay 401 through 415. Operation of these relays provides intermediate storage for encoded control messages. The relays are individually operated by the associated relay drivers as noted above. The energized control relays 401 to 415 will present a zero output to the message selector 350. A deenergized relay will present a one output.

Assuming it is desired to turn a device on in a remote station and assuming further that the point address is 099, key 460' will be depressed to apply the necessary operating ground to relay 460. The contacts 461, 462 and 463 of the control point are wired to the encoder 430 in accordance with the point address 099. When the pushbutton is depressed, relay 460 will also operate to signal the system control logic to change its mode of operation to "point control" placing ground on contacts 464 and 16 volts is extended to operate the decoder in accordance with the predetermined code. Ground is also applied to the flow rate monitor 1001 via contacts 466 and to the associated unit condition indicator 920 by contacts 465. The relays in the register driver 420 selected by the control unit will be held operated until the message is transmitted.

The system control logic 500 controls the sequence of operation required to interrogate and update the displays of each point in the scan sequence. It controls the sequence of operation required to reinterrogate a point until an error free reply has been received or interrogation has been repeated three consecutive times. The system control logic signals the communication monitor each time a point communication fault occurs and each time a new point is interrogated. In point control operation, it controls the sequence of operations necessary to transmit a point control message to select the desired remote station control point. In manual control the system control logic controls the sequence of operation necessary to stop the automatic scan and control the system from the monitor panel. The time for information stored or the time allowed to apply for interrogation can be varied through adjustable electronic timers. The system control logic further provides the necessary timing pulses for the flow rate monitors.

The system control logic controls all master station circuits required for acquisition and storage of indication and data and for the transmission control messages. It has three modes of operation. Automatic scan, point control and manual system control. In its normal mode of automatic scan indication circuits and data displays are continuously being updated, assuming normal operation of the system and error-free transmission. Operation is as follows during the automatic scan: it provides increment signals to the scan message unit 600 to increment the scan from one point address to another, it provides transmit signals to the transceiver 300 to instruct the transceiver to transmit each address. When the reply to each scan address or interrogation is received, it provides a reply signal and discontinues a "no reply" signal to the code converters and indication encoder and a data display "set" signal to the scan matrix 700. These signals are used to update the indication circuits or data display associated with the point address that has been transmitted. After completion of the gating signals, it increments the scan message unit 600 and instructs the transceiver 300 to transmit the new address.

In the event that no reply is received, the transceiver indicates that a transmission error has been detected. The logic will not provide the gating signals or increment the scan message unit 600. It will, however, instruct the transceiver 300 to transmit. The result is a reinterrogation of the point address.

In the event that no reply is received either because of a transmission error in the interrogation or equipment malfunction, the system control logic 500 will, after allowing sufficient time for reply to be received, reinterrogate the point by providing a "transmit" signal to the transceiver without providing an "increment" signal to the scan message unit 600. In the event that an error free reply cannot be obtained from a point after three consecutive interrogations, the system control logic 500 will inform the communications monitor with a "point communications fault" signal that such a fault has occurred and then will continue interrogation at subsequent points. Each time the point address occurs in the scan message counting cycle the point is again interrogated.

In the point control mode of operation, the system control logic is called upon to affect a transmission of a point control message indicated by one of the control pushbuttons 460, 470, etc. This mode of operation can only be initiated when the logic is in automatic scan. The sequence of operations for point control is as follows.

Depression of a control pushbutton such as 460' will cause the control message circuit 400 to signal the system control logic 500 to enter its point control mode of operation. The logic will respond by providing a "register operate" and a "register hold" signal to the control register of the control message circuit by operating its relay drivers 521 and 522 to close ground via contacts 531 and 532. If the point control message associated with the control pushbutton generated within the control message unit 400 will thence be stored and locked in the register, the logic will complete its interrogation of the points in the scan during which point control was requested and then provide a selector operate signal to the message selector, and operation of relay driver 526 to close ground at its associated contacts 536 to the relays 351, 352 and 353 of the message selector 350 as requested and will then provide a selector operate signal to the message selector. Message selector 350 will then connect the output of the control message unit 400 to the transceiver 300 parallel input. After allowing sufficient time for all connections to be made, it will instruct the transceiver 300 to transmit the point control message. If a reply transmission is received with a control message with or without error, regardless of reply content, it will interpret this reply as an answer back and present an answer back signal to the indication circuit to light a lamp associated with the control pushbutton. This answer back signal is always provided but may not always be used. In the event that no lamps are associated with the pushbutton a no answer back signal is provided at the indication circuit which will cause a common answer back alarm indication. After receiving an answer back or after allowing sufficient time for one to be received, the control logic will release the control register 420 and the message selector 350. The automatic scan would be resumed from the point of interruption.

Manual system control is initiated by the stop scan switch 529, which when operated places ground on relay driver 525 to close associated contacts 535 and apply a ground to mode register 520, logic 510 and interrogation counter 540. Thus, mode of operation "set or reset" pulses are generated by the system control logic by operation of relay driver 528 and closure of ground at associated contacts 538 in response to operation of the reset scan key 610 or the set scan key 620. Operation of these switches are used to reset and then set the scan message unit 600 to the point address selected on the scan point address selector switch 621. Operation of the transmit switch 313, operated relay driver 314, and its associated contacts 315 to set the mode register 310 to the transmit mode and the point of interrogation will be affected accordingly.

In response to reply during manual point interrogation, the system control logic will provide reply, no reply and set pulses as it does during automatic scan. However, it does not increment the scan message circuit and instruct the transceiver to transmit as the result of a reply. Automatic scan is resumed by operation of the resume scan switch 524' which closes a ground to relay driver 524 extending ground at associated contacts 534 to the mode register and logic 520, which in turn instructs the system to resume scan in the automatic mode.

The system control logic 500 consists of a reply register and logic 510, an interrogation counter 540, a mode register and logic 520, and a flow rate monitor timer 560.

The reply register and logic 510 provides "reply," "no reply," "set" and "answer back" signals. In addition, it provides "clock" pulses which are used to generate the "increment" and "transmit" signals and to step the mode register and logic 520 along during point control sequence.

The reply and register logic contains a reply register which is set by the "last word received" and "word pulse" signals of the transceiver 300 when a reply is completely received. The reply register includes flip-flops GA and GB which when set will be recognized by the logic associated with the register and the reply and set signals will begin while the no reply signal will terminate. The setting of flip-flop GA also enables a reply timer, after an interval, which is related to the update timer information storage circuits. The timer will produce a pulse which will reset itself and flip-flop GB. The resetting of flip-flop GB will terminate the set signal and enable the gated pulse amplifier. Since GA flip-flop is still set, the timer will continue to run and produce a second pulse which will reset flip-flop GB and hence cause termination of the reply signal and restoration of the no reply signal. These signals occur only when an error free reply is received during automatic scan or manual system control. If an answer back reply is received during point control, an answer back signal will be generated during the interval the flip-flop GA is set. The second reply timer pulse is allowed to propagate through gated pulse amplifier 3 and a no reply timer will produce a clock pulse on its output. This clock pulse is gated in interrogation counter 540 to produce the transmit and increment pulses. In addition, it is used to drive the interrogation counter during automatic scan and the mode register during point control.

The no reply timer's function is to provide clock pulses when none can be obtained from the reply timer as a result of a reply. This timer is enabled whenever the transceiver 300 is in its receive mode and its interval is dependent on the amount of time required to receive a reply from the slowest point in the remote stations. If a point fails to reply during automatic scan, this timer will produce a clock pulse which will be used to increment the interrogation counter and to produce increment and transmit pulses as required. In the point control sequence, the clock pulses it produces are used to change the status of mode register 520 and to produce transmit pulses as required.

The interrogation counter 540 consists of a counter and two gated pulse amplifiers. The counter portion consists of flip-flops designated PA, PB and PC. The function of the counter is to count the number of times a point fails to reply without error to produce a "point communication" fault signal when three such faults occur. It is incremented each time a clock pulse occurs and the reply signal has not been generated. It is reset when an increment pulse occurs. Pulse amplifiers produce an increment pulse when a reply is received during automatic scan, or when a point communication fault signal has occurred. The other gated pulse amplifier is used to produce a transmit signal when a clock pulse occurs during automatic scan or when point control message is transmitted during point control sequence. The mode register and logic 520 consists of four flip-flops designated HA, HB, HC, and HD and the associated logic. Its function is to provide gating signals to the reply register and logic 510 and the interrogation counter 540 and then to produce contact closures which are used to control the control message unit 400 and message selector circuit 350 during the point control sequence. In addition it provides a means whereby the set scan switch 620 and reset scan switch 610 affect the operation of the transceiver 300 and the scan message unit 600 in the manner implied by their names.

In the automatic scan mode the mode register is always reset so that flip-flops HA, HB, HC and HD are all in their "zero" state. Thus, reply set transmit and increment pulses are allowed to occur during automatic scan. In the manual system control mode, flip-flops HA and HD remain in their zero state, but flip-flops HB and HC are set to a set one condition. This resetting of the flip-flops is accomplished by operation of stop scan switch 529 which results in application of ground to driver 525 and result in closure and extension of ground via contacts 525 to the logic circuitry. When the register is in this state, its output is used to prevent the generation of clock pulses in the reply register and logic 510 by inhibiting the no reply timer and gated pulse amplifier. This will prevent transmitted increment pulses from occurring after a response to manual point interrogation. Set and reply pulses, however, may be generated. Operation of the transmit switch will produce a pulse which will instruct the transceiver to transmit. During this operation, relay driver 528 will be operated to close ground at its associated contacts 538 to the set scan switch 620 so that when the set scanner resets, and the scan switches are operated, pulses are available to reset the scan message unit 600 to return to automatic scan.

In a point control mode of operation, the mode register 520 is changed by pulses to provide a sequence of operation required to stop the automatic scan, transmit the control message and then resume automatic scan. The sequence of operations is initiated by operation of a control pushbutton. After pulses from the reply and no reply timers continue sequence until automatic scan is resumed, the following is a list of register states based on point control operation.

One of the control push keys 460', 470', or 480' in control message unit 400 is operated, and closes ground to its associated relay, a contact closure occurs (either contact 464, 474 or 484) to extend ground and operate relay driver 523, closes its associated contact 533 and extends ground to the mode register. This action will stop the automatic scan by inhibiting the increment and transmit signals, allowing reply and set signals to occur for the point under interrogation. The register flip-flops HA, HC and HD are set to state zero flip-flop, HB is set to state one. The point control message may be stored in the control register 420 by initiation of register operate and register hold signals to operation of relay drivers 521 and 522 and resultant contact closures in their associated contacts 531 and 532 to extend ground to the register 420.

When the transmit signal occurs, HA will now be reset to the one state by means of a pulse from the reply timer and no reply timer to operate the message selector by providing ground to the selector operate switch by closure of contacts 536, resulting from operation of relay drive 526.

When the transmit signal occurs, flip-flop HA will be reset to its zero state to permit transmission of the point control message. The register operate signal will be discontinued and the transceiver may now discontinue the register hold signal during transmission of the message to release the stored information. The logic is also in condition now for a reply to the control message to provide an answer back signal.

When the next clock pulse occurs, flip-flop HB will be reset to state zero, allowing the message selector to be released and automatic scan to resume. Selector hold signals and register hold signals will be discontinued and set reply increment and transmit signals may now occur in response to further interrogations. In response to the next clock pulse, the next point in the scan cycle will be interrogated in the previously described manner, the flow rate monitor timer 560 produces four of six timer pulses during each point of interrogation. These pulses are distributed to the flow rate monitor 1001. They are used to drive the logic of the monitor when they are activated by the scan matrix 700. The flow rate timer includes a flip-flop QA which is set by the transceiver at the beginning of each transmission to a remote station. The setting of flip-flop QA enables the timer which will produce pulses at predetermined intervals if the flow rate monitor has been activated the monitor will normally provide a reset one signal. The signal will occur after the third timer pulse and be used to affect a reset of flip-flop QA and hence the timer also when the fourth pulse occurs.

If an upset condition occurs at the flow rate monitor, it will not provide a "reset one" signal, but will instead provide a reset two signal. This pulse will occur after the fifth timer pulse and will be used to effect a reset of QA and hence the timer also when the sixth pulse occurs.

If neither a reset one or reset two signal is transmitted by the flow rate monitor, the result of no monitor actuation, then the increment pulse from the interrogation counter 540 resets flip-flop QA and hence the timer.

The scan matrix circuit 700, upon recognition of a binary code from the scan message unit 600, selects one of a thousand relays on a coordinate basis. The scan matrix prepares the individual displays or storage devices for a data reply for remote stations as well as preparing three indication circuits at a time for replys from remote and master station alarm circuits. The scan matrix 700 facilitates the jumping of scan counts in the scan message unit 600, as well as enabling the flow rate monitor one full scan count after they have been updated. The scan matrix further identifies the first point in the station for the communications monitor circuit.

The scan matrix circuit is the switching matrix composed of relays which select and prepare the system display devices for alarm status and data replys from remote and master station equipment. The circuit is designed to handle a maximum of 1,000 three digit data points, if the matrix is fully equipped. In the present embodiment, the circuit has been designed to be contructed in modular forms that any number of points less than the maximum indicated can be provided. The decoding gates and buffering circuitry comprising scanners 701, 702 through 712 and digit decoder 799 are solid state devices consisting of NOR gates, level drivers and relay drivers. The matrix itself consists of relays arranged in a ten by one hundred array. The scan matrix 700 also includes set relay 713. The Y access inputs to the relay matrix are driven by relay drivers such as 720 through 729 (722–728 not shown), which in turn are driven by code recognition gates, part of scanner 701. The Y access gates receive their inputs from the units digit output of the scan message unit 600, scanner 633 provides the outputs for scanner 701.

The X access inputs drive up to ten scanners 701 through 712, which each include ten relay drivers, for example, 740 through 749 associated with scanner 702 and 760 through 769 associated with scanner 712. Scanners 702 through 712 are operated through nil gates. These gates receive inputs from individual decoding gates which are driven by the hundreds digit output obtained from scanner 653. These gates also receive inputs from digit decoder 799 which is a common driver to scanner 702 through 712. The digit decoder decodes the outputs of the tens scanner 643 of scan message circuit 600. Various relays 780 through 788 shown connected in the scan matrix across the X and Y axis illustrate how the output contacts of each of these relays may be wired to satisfy requirements of the system. The set relay 713 operates on every count from the scan message unit 600. Normally each relay in the matrix carries the same number of contacts and the individual contacts on each are strapped to perform the required functions. However, in the scan matrix 700 as shown the unused contacts on each of the relays have not been shown.

The evaluation of the contact assignments made on the relays shown is as follows:

Relay 780 is equipped for an alarm point to which the address 000 has been assigned. Its contacts 780A complete the circuit between the no alarm bus of the indication equipment and alarm indication unit 910 when closed. Contacts 780B extend battery when the contacts are closed to the alarm indication unit 910 to complete the circuit when an incoming alarm condition is noted on the alarm bus of the indication equipment. Contacts 780C are strapped to extend ground when operated to the communication monitor 570 to indicate that the point indicated by address 000 is a first point in a new station. As may be noted, relay 786 has similar contacts which would indicate that the point represented by address 990 is for another new station. Appropriate visual indications of the station being interrogates thus are operated by the communication monitor in response to closure of contacts such as 780C. Contacts 780D when operated extend ground to the station common alarm equipment 670. This is further associated with communication monitor 570.

Relay 781 associated with the address 001 is equipped for enabling the unit condition indicator unit such as 920. Operation of relay 781 will close ground at contacts 781A to unit condition indicator 920, as well as close ground to station common alarm lead contacts 781C. On the assumption addresses between 001 and 009 are not being used, contacts 781B apply ground over the jump matrix busses H0, T0 and U9, where they are extended to the jump logic units 631, 641 and 651, causing the associated scan counters 632, 642 and 652 to be forced ahead directly to the count of 009 without transmitting pulses for the intermediate addresses. It should further be noted that relays 784 and 787 have likewise been so equipped for count advance purposes.

Relay 782 is equipped to enable isolation gate indication equipment 930. Operation of relay 782 will close ground at its contacts 782A to the isolation gate equipment to prepare it for receipt of information over either the alarm or no alarm busses of the indication equipment. Likewise its contact 782B when operated will extend ground to the station common alarm equipment.

Relay 783 assigned to code address 010 will enable its contacts 783A for extension of ground to in line display 940 to enable that unit to receive digital information representative of a pressure reading or flow rate at a point at one of the remote stations. Contacts 783B close ground via the set lead to set equipment in the data logic 1000 for recording of new information therein. Ground is also closed at 783C to the common alarm equipment.

Relay 784 associated with the code address 011 closes ground at its contacts 784A to the flow rate monitor 1001 to enable that device, closes ground at its contacts 784B to in line display 950 to prepare that unit for reception of Varac coded information representative of tank level or similar measurement at one of the remote offices. Ground is applied to the jump logic as previously noted at contacts 784C. Ground is also extended at contacts 784D to set the data logger. At contacts 784E ground is closed to the common alarm lead.

The remaining relays 786, 787 and 788 associated with address points 990, 991 and 999 are not shown as being assigned to any indication equipment and are merely shown to indicate the extent of possible assignments within the scan matrix 700.

The ten code recognition gates in scanner 701 are wired to decode from binary to decimal form the output of the scan message units counter 633. The digit decoder 799 has ten code recognition gates which are wired to the outputs of the tens count scanner. Scanners 702 through 712 each have one code recognition gate, all of which are wired to the outputs of the hundreds scan counter 653. The code recognition gate associated with scanner 702 recognizes the count of zero in the hundreds digit and the gate in scanner 712 recognizes the count of nine in the hundred digit. Associated scanners 703 through 711 not shown would recognize digits, one through eight accordingly. The outputs of scanners 702 through 712 each drive relay drivers which close battery through to ten of the relays associated with the address of individual points in the system. A total of 100 relays are thus accessed by scanners 702 through 712. To further understand the operation of the scanners 710 through 712 and digit decoder 799 assume the number to be selected is 011. The outputs of the scanners 633, 643 and 653 in scan message unit 600 give the coded equivalents of the decimal count 001. The second gate in scanner 701 decodes the decimal count of one, the first gate in the digit decoder decodes the tens count of zero and the first gate in scanner 702 decodes the hundreds count of zero. The coincidence of an output from the first gate in the digit decoder 799 and the first gate in scanner 702 operates the associated core driver 740 to close its associated contacts 750 to complete the path through diode 791 to relay 781 which is associated with the address 001. The initial marking of the second gate in scanner 701 operates relay driver 721 to close its associated contact 731 to complete the path of ground through relay 781.

The indication decoder 820 takes coded information that has been received at the master station and converts this information into a relay contact closure corresponding to the code received. It is possible to provide several decoders for interrogation of more than one point simultaneously. However, for convenience sake, only one indication decoder has been shown in this embodiment. Associated with the indication decoder are five separate common information highways indicative of on, off, in transit, alarm or no alarm condition points interrogated in the remote offices.

The indication decoder 820 consists of five, four input NOR gates with five associated relay drivers. Inverters are used in some of the inputs to provide inverse functions and to prevent overloading of the transceiver 300 when necessary.

Indication decoders receive an input from the system control logic 500 to enable the indication decoder. When an indication code is received by the transceiver 300, it is directed to the indication decoder via normally closed contacts in the indication simulator. Switch 810 and both the enabling signal from the system control logic 500 and indication code in the transceiver are present at the decoder. The decode operation is performed causing one of the relay drivers 821 through 825 inclusive to close their associated contacts extending ground via the indication highways previously noted. Operation of relay driver 821 will close its associated contacts 831 to complete ground on the highway to indicate an on or open code. Operation of relay driver 822 will close its associated contacts 832 to close ground on the off highway to indicate an off or unit closed condition. Operation of relay driver 823 will close its associated contacts 833 to close ground to the intransit highway to indicate an intransit condition at one of the distant points. Operation of relay driver 824 will close its associated contacts 834 to extend ground via the alarm highway to indicate an alarm or isolation gate open condition at the point being interrogated at the remote station. And operation of relay driver 825 to close its associated contacts 835 to place a ground upon the no alarm highway will provide an indication of no alarm or isolation gate closed. The Datex code converter 830 provides a means for converting from Datex binary coded cyclic decimal code to an arabic decimal code. The discusion of these particular codes may be found in instrution sheet 17E300 prepared by the Taylor Instrument Company.

Components used for conversion are NOR gates, nil gates and associated relay drivers. The relay drivers are used to drive display units or storage devices after conversion has been completed.

The code conversion is performed in two steps. The binary code is first converted into a cyclic decimal number and then into the arabic or standard decimal number. To meet the requirement that any two adjacent numbers differ in only one contact closure, it is necessary to modify the ordinary decimal number system (hereafter called the arabic decimal). The modified decimal number system is called "cyclic decimal." Cyclic decimal numbers are counted as follows 1, 2, 3, 4, 5, 6, 7, 8, 9, 19, 18, 17, 16, 15, 14, 13, 11, 12, 10, 20, 21, 22, 23, 24, 25, etc. Note that any two adjacent numbers differ in only one decimal digit. A rule for translating cyclic decimal to arabic decimal is as follows: the first significant number hundred digit of any number is not changed because it always follows a "0" understood. The nines complement of that number is the number which must be added to the original number to equal nine. Thus the number three is the nines complement of six as six plus three equals nine. The clue as to whether the preceding digit is odd or even when translating to cyclic decimal to arabic decimal is always determined from the digit in the arabic manner. The cyclic decimal digit that follows an even arabic digit is not complemented. A cyclic decimal digit that follows an odd arabic digit is changed to the nines complement when it is written in arabic decimal. Each decimal digit of a cyclic decimal number is represented by a different combination of four binary bits from the binary code each binary bit represents one contact closure between it.

The inputs to the Datex code converter are from the transceiver 300 and specifically from the shift register 320. The decimal digit to be converted marks the output of four flip-flops in the shift register. The converter output is a four bit 8–4–2–1 binary code in each decimal number.

Each of the relay drivers causes a contact closure in receipt of a one or two input. Drivers that have been enabled will by means of their associated contacts close a negative 48 volts to signal coils of the associated in line display units 940.

The Varac code converter 860 converts a 14 bit digital code produced by Varac tank level gauge to a standard 8–4–2–1 weighted code which can be used by part of the common station equipment at the master station. The Varac code converter 860 consists of the logic portion used in converting the Varac code and a relay driver arrangement consisting of drivers 861 through 895, used in converting the decoded information into contact closures usable for powering the associated in line display 950. The Varac code converter 860 receives its inputs representative of coded information from the shift register of transceiver 300. In addition, an enabling pulse is supplied from the system control logic 500 to enable the Varac code converter. Upon receipt of both an enabling pulse and coded information from the transceiver selected relay drivers will be operated to effect contact closures that will operate the associated in line display unit 950 to provide visual representations of the coded information received from the remote station.

Referring now to the indication equipment 900, alarm indicator 910 upon recognition of an alarm condition sounds an audible alarm and flashes a lamp. After the alarm has been acknowledged by depressing the alarm silence pushbutton, the audible alarm will be silenced and a flashing lamp will burn steadily. This lamp will continue to burn steadily until a no alarm code is received. The circuit receives alarm codes by monitoring the common alarm highway connected to the indication decoder by contacts 834. The no alarm code is received from the common highway via contacts 780A on relay 780 in the scan matrix 700. Contact 780B in the scan matrix extends battery to alarm indicator 910 to actuate it to receive the information present on the common highway.

The unit condition indicator 920 indicates the status of a pumping unit at a remote station. In response to interrogation of a point of this sort in a remote office, codes representative of unit on, unit off, or unit in transit will be returned to the transceiver, another to the decoder equipment, and applied to the appropriate highway. When a unit on condition is discovered during interrogation, the decoder in response to this message will operate its relay driver 821 to close ground to the on indication highway at contacts 831, if an off condition is determined, relay driver 822 will be operated to apply ground via its associated contacts 832 to the common highway and thence to the unit condition indicator, or if an in transit condition is discovered, relay driver 823 will be operated to close ground through contacts 833 to the common in transit highway and thence to the unit condition indicator 920. In addition, enabling ground is extended by the associated relay in the scan matrix in this case 781 representative of the code 001 to the unit condition indicator 920. When a command has been received at a remote station, the system control logic 500 will operate its relay driver 512 to close ground to associated contacts 513 to the unit condition indicator to indicate an answer back code.

The isolation gate indicator circuit 930 will indicate if an assigned isolation gate is open or closed. It will also sound an audible alarm and flash a lamp if an uncalled for change in the condition of the gate occurs at a remote station. Isolation gate open and isolation gate closed codes come from the common highways normally assigned for an alarm or no alarm condition. These indications appear as ground pulses on the common highway by operation of relay driver 824 or 825 and would result in contact closures and extension of ground via contacts 834 or 835. The ground pulse of contact 782A in the scan matrix indicates that an alarm gate indicator should operate by virtue of contact closures originating from interrogation of point 009 and operation of associated relay 782. Ground is also supplied from the control message unit 400 and the on and off leads indicated as part of isolation gate 930 to indicate the depression of unit start or unit stop pushbuttons respectively that are a portion of the control message unit. Under normal conditions, a lamp forms a portion of the isolation gate indicator and will be out when the isolation gate is open and will flow steadily when the gate is closed. This change in condition of the lamp will follow each new indication code received without sounding an alarm, providing that an appropriate pushbutton is depressed to initiate the change.

If a change in the gate's condition should occur without a command originating at the master station in the control message unit 400, the lamp will flash and a buzzer will sound. After depressing the alarm silence pushbutton, the buzzer will silence and the lamp will indicate the present condition of the gate by means of steady light.

In line display units 940 and 950 for use with the Datex converter and Varac converter respectively, are visual indicating units operated in response to selectively applied battery, applied to the input circuits in response to operation of code selector relays in the Datex or Varac converters. The in line display unit 940 associated with the Datex code converter receives an enabling ground when contacts 783A of relay 783 associated with the address point 010 are closed. In addition, an output is available to both the data logger 1000 and the flow rate monitor 1001 from the in line display for recording in those devices. A set pulse is also extended from the group relay and counter and control 1010 in the data logger 1000.

In line display unit 950 associated with the Varac code converter operates in a similar manner to that of the in line display 940, except that it is actuated in response to extension of ground at contacts 784B in response to operation of relay 784 which is associated with the point address 011.

In addition to the indication equipment 900, several other indicators are also included. These include a point communication alarm 660, a station communication alarm 670 and the flow rate alarm 1002.

A point communication alarm unit 660 will indicate an alarm condition if a point fails to reply to three consecutive interrogations. The circuit is commanded to look for an input by a ground pulse originating at the scan matrix 700 by means of one of the several contacts including 780D, 781C, 782B, 783C, 784E, 785A, 786B, 787B and 788A. If an alarm is detected by the communication monitor, it will direct a ground pulse to an associated audible and visual alarm circuit to flash a lamp and sound a buzzer. The associated lever key, when activated, will silence the buzzer and the lamp will flash at a rate determined by the communication monitor 570.

A station communication alarm unit 670 will sound an alarm if three consecutive points at a given remote station fail to reply. This alarm condition is detected by the communication monitor 570 if ground pulse from the communication monitor were to cause an alarm lamp to flash and an associated buzzer to sound. When the associated alarm silence pushbutton is depressed, the buzzer resounds and the lamp will glow steadily until the communication monitor notes that the alarm has been corrected and this time will place a ground on the alarm release lead to extinguish an alarm lamp. The station terminal alarm circuit 670 is actuated in response to placement of ground by one of the common ground contacts previously referred to in connection with the point communications alarm circuit.

The flow rate alarm unit 1002 will flash an associated lamp and sound a buzzer when it receives an alarm indication from the flow rate monitor circuit 1001. As in the connection with the other alarm circuits previously mentioned, alarm circuit will operate in response to extension of ground in this case from the flow rate monitor. When an associated alarm silence pushbutton is depressed, the lamp will be extinguished and the buzzer will be silenced.

The data logger 1000 is a group of related circuits operating in parallel to the in line display units 940 and 950 and recording the information that appears on the in line display units.

Specifically, the output writer 1080 represents a modified electric typewriter with a 30" carriage. Additional keys have been added to print fractions (⅛ through ⅞). Isolated normally closed contacts have been added within the typewriter that will open when the carriage return is being acted upon. A red or black color selection may also be performed remotely. The command counter and control is made up of a group of relays. Their function is to advance one count for every command completed by the electric typewriter. The commands that will be counted include printed and non printed commands such as tab and carriage return. When a particular group has been printed, this counter is reset to the count of one and will then start counting the command initiated by the next group relay. The capacity of this counting chain will set the limit on the number of command that a group relay may initiate. A locking lever key is included and is depressed whenever paper is to be changed on the electric typewriter. Depression of this lever will prevent the starting of the printing cycle. Every time the electric typewriter has completed a command, another relay will operate to advance the group relay counter one count and reset the command completed counter back to the count of one. A group relay counter and control 1010 direct the grounded outputs of the command completed counter to various circuits thus initiating the printing of constants and the decoding and printing of variables.

The printer control and timer 1030 initiate a print-out automatically or manually (by operation of a pushbutton). The frequency with which the automatic print-out occurs may be preset by setting the internal timer which is a standard commercial unit. The carriage return command resets the mechanical timer after each print-out, thus starting a new timing cycle.

The digital clock 1020 provides serial and decimal output contact closure patterns representing 24 hour time. The serial output is accomplished by sequentially grounding a group of output leads which extend to the group relay counter. The digital clock includes the provision whereby interrogation of the digital clock is prevented unless there is sufficient time for a complete readout before the output changes. The alarm recognition and counter 1090, upon receiving an alarm indication from the flow rate monitor, will initiate multiple print-outs. Normal operation of the internal counter will cause alarm figures to be printed three times, as well as applying a control signal to the color selector to shift the output reader from black to red printing.

The color selector 1050, as noted above, directs a color change command from the alarm recognition circuit 1090 to the modified electric typewriter which constitutes the output writer 1080. It also simulates a command completed indication to the command completed counter 1040.

Decoder matrix 1070 consists of a relay decimal decoding matrix and marks certain decoded digits as being fractions. Appropriate markings to the output writer are extended in response to recording of this information at the in line display and accordingly the recognition of same at the decoder matrix.

When the printer control and timer 1030 times out, it initiates a logging cycle by advancing the group relay and counter to the count of one. The interval between print-outs may be varied by changing the setting of this timer. The group relay counter and control 1010 will then initiate the first character to be printed by directing a ground to the appropriate magnet in the electric typewriter (output writer 1080). Upon completion of the command, the electric typewriter will indicate this to the command completed control unit 1040. The command completed counter 1040 will advance to the count of two, thus indicating to the group relay counter 1010 that the typewriter is prepared to receive an additional command. This sequence will continue until all constant variables have been printed. The last function that will be requested by the first counter group relay counter will be a tab command. Simultaneously, it will reset the command completed counter and advance to the next counter group relay counter. At this point, the group relay counter will start the printing of data associated with the second group when the last character of the last group has been printed, a carriage return will be initiated by the group relay counter in conjunction with the proper count of the command completed counter. When the carriage return function is completed, the printer control 1030 will start the mechanical timer. If a constant is to be printed, the group relay counter 1010 starts a ground pulse directly to the typewriter. The time is printed by sequentially directing four separate ground pulses to the digital clock 1020. Variable data to be printed is taken out of storage and directed to the decoding matrix 1070 which recognizes variables from the 8–4–2–1 code into decimal form. The alarm recognition circuit 1090, upon receiving alarm indication, will initiate one or more print-outs (in the practical embodiment three print-outs are made). These print-outs may have the data pertaining to the station indicating an alarm printed in red.

When the zero to 120 mechanical counter is timed out, an internal contact closure will occur to start the group relay counter 1010. A relay in the command counter and control 1040 is held normally operated through a closed contact in the electric typewriter. This contact will momentarily open after each command has been completed by the typewriter. Each time the function has been completed by the electric typewriter, the relay will restore. When the relay restores the kickup or advance relay in the group relay counter will be operated to advance the count in the relay counter.

The digital colck has a decimal output time indication based on a 24 hour time cycle. Each time print-out occurs, decimal output in terms of units of hours, tens of minutes and units of minutes to be recorded at the output writer.

The flow rate monitor 1001 is used to detect abnormal flow rate changes. The input to the flow rate monitor consists of parallel connections from the in line display units. Data displays may be updated every few minutes. If initial deviation exceeds a rate of ten barrels an hour in a period between one update and the succeeding one, a fifteen minute timer is started. Should the flow rate change in the fifteen minute interval by more than the selected value which may be preselected on a digit switch, an alarm condition will exist. If, however, the limits are not exceeded in the fifteen minute interval, the flow rate monitor will reset. The digit switches can select any limit from plus or minus ten barrels an hour to 100 barrels per hour. The flow rate monitor 1001 consists of a Wheatstone bridge, control logic for the bridge and timers with associated hold relays.

The control logic consists of three flip-flops used as the state register, one flip-flop used as a one bit memory, state control gates, relay driver decoding gates and relay drivers. The state control gates accept the present state of all the flip-flops. The condition of the fifteen minute timer, the condition of the thirty minute timer, the decision amplifier output and the start contact of the scan matrix. The start control gates reduce this information to the correct binary levels which are presented to the inputs of the flip-flop. When the clock pulse occurs, the flip-flops are set to the code that has been presented to the D.C. inputs. The relay driver decoding gates decode the outputs of the flip-flops and drive the relay drivers which are to be operated in the various states of the register, the binary code bridge circuit consists of precision registers which are shunted by the contacts of the relays. The combined resistance of the code resistances not shunted by the contacts is proportional to the base value of the flow. Certain resistances represent the flow being monitored and others represent the maximum limit the flow may deviate from the base. These values of resistance are compared by detecting the voltage across the bridge with the decision amplifier. The decision amplifier sends a positive voltage across the bridge. It will then amplify this voltage and store it as a binary one. The digit switch is a ten position switch which encodes the decimal digits 10, 20 and so on up to 100 into a 8-4-2-1 code. If, for example, the decimal quantity 70 was indexed on the digit switch, the 4, 2 and 1 outputs of the switch would have a —48 volt potential on them. This would enable the relays thus placing 70 ohms in one leg of the Wheatstone bridge. The flow rate monitor inclueds a fifteen minute synchronous motor driven timer. A solenoid is energized to engage the gearing and start the timing. When timed out normally open and normally closed contacts change to closed and open respectively. When the coil is energized, the timer and contacts reset to the original condition. The timer is used to measure the time interval during which the rate of change in flow is being monitored to determine if it exceeds the preset limits. The control relay for the fifteen minute timer provides a sustained control signal to the timer. The relay is actuated by a momentary contact closure in the control logic. The flow rate monitor also includes a thirty minute synchronous motor driven timer. Its operation is identical to the fifteen minute timer. There is one such timer for each remote station at which the rate of flow is being monitored. The timer is activated with the depression of any "start" button associated with the remote station being monitored. Its purpose is to inhibit alarm conditions for thirty minutes after an "on" control has been initiated. The control relay for the thirty minute timer provides a sustained control signal for the thirty minute timer. In this case too, the relay is activated by contact closure from the control message circuit.

REMOTE STATION EQUIPMENT

Referring now to FIGURES 11, 12, 13, 14 and 15 in combination for a detailed description of the equipment in a remote station like those in the present system.

Incoming signals from the master station are received at the tone receiver 1101 via the communication link and outgoing signals are transmitted via the communication link by tone transmitter 1102.

The control logic 1110 resets the associated transceiver 1200 if the transceiver's internal logic circuitry enters the incorrect state or if an incomplete message were to be received. The logic also holds a selected relay in the point selector 1400 operated until the information selected for transmission is loaded into the transceiver 1200. The control logic further connects the output of tone transmitter 1102 to the remote master communication link when a message is to be transmitted to the master station. It further insures that the tone transmitter 1102 is off the line when a transmission is completed. The control logic 1110 when signalled by an appropriate remote station circuit instructs the transceiver to transmit. The control logic provides the control of communication in the remote circuit.

Assuming a point address has been received by the tone receiver 1101, and transceiver 1200 this information in turn has been decoded by decoder 1300 a point selection has been made in the point selector 1400, relay driver 1150 which is normally operated by its associated contacts such as 1410, 1420, etc. would be operated and at its hold contacts such as 1413, 1423, etc. close a holding path to energize the associated selected relay. Depending on the nature of requested information ground will either be returned from one of the point selector relays mentioned above or from access unit 1550 or access unit 1540 to operate line relay 1170. Operation of line relay 1170 will connect the tone transmitter 1102 to the communication link by contacts 1173 and 1174 and remove ground from relay driver 1120 at contacts 1171 relay driver 1120 will operate in response to removal of ground to extend ground at its associated contacts 1121 to the transceiver 1200 via mode register 1212 to signal the transceiver 1200 to transmit. The transceiver when transmitting will operate relay driver 1160 which in turn will close its associated contacts 1161 to extend a holding path to the line relay 1170 to maintain it operated. When the transceiver 1200 resets its shift register 1220 prior to loading itself with the reply information it will cause the point selector 1400 to deenergize the operate winding of the selected relay. However the selected relay will remain operated until the beginning of the last word of the transmission. When this word is being transmitted the transceiver 1200 will reenergize relay driver 1150 to open its associated contacts 1151 which completed the holding path to the selected relay in the point selector 1400. When the transmission is completed the transceiver 1200 reverts to its receive mode and relay driver 1160 will deenergize to open the hold path also at contacts 1161 relay driver 1160 will hold the line relay 1170 energized and so this relay will now release, causing disconnection of the tone transmitter from the communications link. The control logic is now back to its steady state.

Relay 1140 acts as a monitor to insure that line relay 1170 deenergizes after a transmission. It is not necessary to the operation at the remote station but is used to provide some measure of protection against loss of system communication due to equipment malfunction in one remote station. This type of failure could possibly be caused by the failure of the line relay in a remote to deenergize after a transmission. Failure of the line relay 1170 to deenergize will allow the tone transmitter 1102 to continuously place tone on the remote to master station communication line which is shared by the remotes.

The monitor relay 1140 operates in the following manner: when the remote station finishes its reply transmission, the line relay 1170 should deenergize after the transceiver reverts to the receive mode. Relay driver 1130 operates to extend ground at its associated contacts 1131 to the monitor relay 1140. If the line relay 1170 is still energized both —48 volts and ground will be applied to the monitor relay 1140. If the line relay 1170 remains operated for longer than 20 milliseconds, the line monitor relay 1140 will operate and disconnect the tone transmitter from the line at its associated contacts 1141 and 1142. When the line relay 1170 then deenergizes, the line monitor relay 1140 will deenergize because of the opening of contacts 1172.

The transceiver 1200 is identical to that used at the master station with two exceptions. The first is the transceiver is connected to the remaining circuitry in the remote station in the manner shown in FIGURE 12. And the second is the inclusion of equipment to perform a constant ratio check on each word received.

The constant ratio detector 1210, signals the error register 1208 if a constant ratio code error has occurred. As each word is received the constant ratio detector 1210 counts the number of ones contained in the received word. If the number of ones is not correct it will then set the error register 1208. The function of the constant ratio detector 1210 is to determine if the correct number of ones or marks are present in each code word received. The constant ratio detector consists of two flip-flops which along with three gate circuits constitute a straight binary counter. This counter counts the number of marks received from each word. Since the counter can only count to three marks after three, received cause the counter to reset and count again. Only two constant ratio binary coded decimal codes are possible in a five bit word that is two marks to three spaces or three marks to two spaces. The counter that comprises the constant ratio detector is incremented each time a mark is shifted into the shift register 1220. It is incremented if the space output of the serial input logic 1211 is a "zero" when a shift pulse occurs. It is reset by gated clock pulse in each stop pulse interval. Error register 1208 included in transceiver 1200 unlike its counter part at the master station can be set by either the constant ratio detector 1210 or the serial parity check logic 1209.

In addition to the above distinguishing references between the transceiver 1200 of the remote station and the transceiver of the master station a timer 1207 is included to reset the transceiver 1200 logic when an incomplete transmission is received or if the transceiver logic enters an unnatural state.

In normal operation transmission line noise may obscure an entire word. This would cause the transceiver to fall "out of step" with the master station. To correct such a situation the timer measures the interval during which a message is to be received (transceiver is not in its steady state) and will provide a reset pulse to the transceiver if this interval is exceeded. The interval is determined on the broad rate of transmission. If the transceiver should enter an undesired state, a state which is logical will become effective. This may happen if power to the remote station were turned off and then reapplied. By measuring the interval of the transceiver when not in its steady state, and by providing a resultant reset clock pulse the timer 1207 will restore normal operation.

The decoder 1300 assists in the selection of points in a remote station in response to constant ratio point addresses transmitted by the master station. The decoder control 1301 allows the digit decoders 1310, 1340 and 1370 to operate when the transceiver 1200 is in the steady state (not transmitting or receiving messages) and when error register 1208 is not set. The decoder control 1301 consists of a NOR gate which is used to recognize any of the above conditions. The output of the gate comprises an inverter level driver configuration. This configuration provides the necessary drive to enable the above mentioned digit decoders.

Digit decoders 1310, 1340 and 1370 accept the constant ratio messages transmitted by the master station and stored in the transceiver 1200. Decimal decoders perform a constant ratio code to decimal conversion on each digit. Decoder 1310 decodes the hundred digit, decoder 1340 the tens digit and decoder 1370 the units digit. The units and tens decoders are identical and consist of ten three input NOR gates with ten associated relay drivers. The hundreds decoder consists of ten three input NOR gates, ten inverters and ten relay drivers with a gate in the decoder 1310 as an inverter and a relay driver associated with it.

The gates at each decoder decode the coded equivalent of the decimal digits zero through nine respectively. The relay driver contact associated with each digit decoder is normally open. When a point address is received and stored in the transceiver the units decoder will place ground on one of its ten decimal outputs. The tens digit decoder 1340 will place battery on one of its ten decimal outputs, the hundreds decoder will also place ground on one of its ten decimal outputs. The application of ground to a selected output at one of the contacts 1330 through 1339 of the hundreds decoder 1310 extends ground to a group of relays and associated relay drivers such as 1411 through 1481 connected to the selected highways to which ground is extended. Extension of this ground will operate the associated relay driver to close its associated contacts. For example placement of ground on contacts 1330 will operate relay driver 1411 which will close its associated contacts 1412 assuming that the code transmitted by the master station and received at this remote station was 000 ground would also be present by the closure of contacts 1390, the units decoder to the upper winding of relay 1410, and battery by operation of relay driver 1350 and associated closure of associated contacts 1360 will be extended through closed contacts 1412 to complete the circuit to the upper winding of relay 1410 in this manner on a coincidence basis the selected points are energized.

The point selector 1400 selects the actual point in a remote station in response to the decoded selection information received from the decoder 1300. Operation of the selector relay such as 1410 through 1480 may interrogate alarm or unit status indication devices, remote station alarms or unit status change detection devices, interrogate digital data devices or select a control function.

The point selection relays may be equipped in several different manners each of which would indicate a different selection function. It is possible that a particular configuration may be used more than once in a given remote station. It is also conceivable that a particular point selector relay configuration may not be required in a given remote. Each of these selector relays has a units, tens and hundreds input. Each of the point selector relays is assigned a unique point address. In the point selector 1400 shown, the point addresses 000 001 009 010 011 090 091 and 099 have been assigned. As noted above the conditions that must be present for operation of each selector relay these are ground on the hundreds input, battery on the tens input and ground on the units input. Once operated the point selector relay will be held operated until released at a later time by the control logic 1110 after its function has been completed.

Several different configurations are used for the point selector relays for example relay 1410 is used to select an alarm indication device. This relay when operated provides ground via its contact 1414 to alarm encoder relay 1580 in the indication encoder and access unit 1540. In addition relay 1410 signals the control logic by application of ground at contacts 1415 to instruct the transceiver 1200 to transmit the selected information. Relay 1420 is used to select three unit status devices. The relay when operated provides ground via three contacts 1424, 1425 and 1426 to the three unit status encoding relays 1550, 1560 and 1570 in the indication encoder and access unit 1540. When the selected information is available the indication encoder circuit will signal the control logic 1110 by application of ground at contacts 1573 or 1561 or 1551 to instruct the transceiver 1200 to transmit. Relay 1430 is used to select an isolation gate indication device. The relay when operated provides ground via its contact 1434 to the isolation gate indication encoding relay 1590. Like relay 1410 relay 1430 applies ground via its contact 1435 to the control logic 1110 to instruct the transceiver 1200 to transmit.

Relay 1440 is used to select a Datex, disc type digital data device, the relay when operated energizes the outputs of the device by the Datex encoder and access unit 1520 by application of battery at contacts 1444. Relay 1440 at its contacts 1445 signals the control logic 1110 to instruct the transceiver 1200 to transmit the selected information.

Relay 1450 associated with the access code 011 is used to select a Varac tank level digital output device. The relay when operated will apply ground at its contacts 1454 to instruct the tank level readout and access unit 1530 to select the Varac device associated with the point address. The tank level readout unit 1530 will then connect the outputs of the Varac or liquid level indicator 1531 to the reply transfer circuit 1250 and signal the control logic 1110 by means of application to ground to the common transmit lead to instruct the transceiver to transmit the selected information.

Relays 1460, 1470 and 1480 represented by access code 090, 091, and 099 respectively are used to select a control function in the control point access unit 1510 the relay when operated in the case of relay 1480 extends ground at its contacts 1484 to turn a unit on, in the case of relay 1470 extension of ground at its contacts 1474 is utilized to turn the unit off and application of ground at contacts 1464 ground will be effective to reset a control unit. Relays 1460, 1470 and 1480 operate and apply ground to the common transmit lead at their contacts 1465, 1475 and 1485 respectively to operate the control logic 1110 to instruct the transceiver to signal an answer back in response to the control message at the master station. The control point access unit 1510 by means of heavy duty contacts included therein may be operated to start or stop a pumping unit or affect any other control which requires a non interlocking momentary contact closure it also provides heavy duty contacts to signals to open or close a valve unit or provide any control which may require a non interlocking timed contact closure.

Selection of the control function in the control point access unit 1510 is performed by the point selector 1400 by closing an operate path to a preassigned relay in the control point access unit 1510 a control point circuit will be assigned to each unit that is to be controlled. Three control commands may be initiated by the circuit stop, start and reset, to the operation of three relays and turned over to the control point access unit 1510. Each start, stop and reset command is initiated by a different selector relay in the point selector 1400 the contact combinations that can transfer this equipment to the pipeline control equipment 1501 are all silver ¼″ diameter contacts rated at 5 amps at 220 volts A.C.

Assuming for the moment that a point control code of 099 was transmitted from the master station and received at the remote station and decoded by the decoder 1300 and applied to the point selector 1400 to relay 1480 closure of contacts 1484 will extend ground to the control point access unit 1510 which will cause an associated relay to energize and lock causing closure of a pair of the heavy duty contacts referred to above which are connected to a valve, pump or similar control unit. Until a new control command is transmitted this equipment will remain in this position. The off and on contacts are so interlocked that when an off command is received such as might be affected to operate relay 1470 characterized by the address 091 that the "on" condition of the "on" relay in the point access unit will be released.

Included in the access and encoding equipment 1503 is the indication encoder and access unit 1540. This unit provides a common group of encoding relays which generate codes for on, off, in transit, alarm and isolation gate indications. An unlimited number of points may share this group of coding relays (relays 1550–1590 inclusive). This unit provides a means at the remote stations for interrogating various indication points and encoding the point status indications to be transmitted to the master station.

A point selector relay 1420 initiates interrogation of the unit status point by closure of its contacts 1424, 1425 and 1426. The point selector relay like 1410 by closure of its contacts 1414 will initiate interrogation of an alarm point and a point encoder relay such as 1430 by closure of its associated contacts 1434 will initiate interrogation of an isolation gate point such as 1543. The contacts of the isolation gate 1543 of the alarm monitor 1542 consist of a single set of contacts and monitoring equipment located on such equipment as a pipeline operator may provide to monitor isolation gates or other alarm devices. A valve pump or motor monitor such as shown as 1541 may have three sets of open contacts which indicate specific conditions such as off, on or in transit. Closure of the single contacts in the isolation gate valve monitor 1543 or the alarm monitor 1542 will cause operation of the proper encoding relay in the indication encoder and access unit 1540. In the case of the valve pump or motor monitor like 1541 one of these sets of contacts will be closed depending on the current status of the device that the monitor is associated with. In this case the condition indicated by the closed contacts will operate either the "in transit" relay 1570, the "on" relay 1560 or the "off" relay 1550 in the indication decoder and access unit 1540 to signal the condition to the transceiver and then back to the master station.

In detail now if an alarm indication contact is to be interrogated, the relays like 1430 will be operated to extend ground at contacts 1434 to place ground on one side of the appropriate normally open contact 1542A. If an alarm condition is present, represented by a contact closure at this point, the ground pulse will be directed to relay 1580. The operation of this relay will close a circuit from a −16 volt bus to the reply transfer unit 1250 which in turn will transmit an alarm code back to the master station. In the event that the contacts interrogated are open relay 1580 will not operate and the reply transfer circuit will interpret the lack of −16 volts as a no alarm indication. One side of all normally opened contacts associated with alarm monitors are common to relay 1580 shown in the indication encoder and access unit 1540 thus several alarm monitors and their associated contacts may share one alarm encoding relay.

The method of operation employed in transmission of an isolation gate indication is the same as for an alarm monitor as noted above. When the point selector 1400 desires to interrogate the status of a pumping unit or similar device, it will place a ground via contacts 1424, 1425 and 1426 in response to operation of relay 1420 to the contacts 1541A, 1541B and 1541C the valve pump or motor monitor equipment 1541 the other side of these contacts are wired to the intransit on and off relays 1570, 1560 and 1550 respectively. Operate paths of relays 1560 and 1550 the on and off relays both pass through normally closed contacts of the intransit relay 1570 thus assuring the proper code being generated. Closing of valve and intransit contacts in the monitor 1541 would be interpreted as an "in transit" indication. If either one of the three relays 1550, 1560 or 1570 are operated, its contacts will close a path from the −16 volt bus to the reply transfer unit 1250. The combinations of these contacts are coded indications that the reply transfer unit 1250 will transmit back to the master station. The technique of interrogating additional units for the use of the same relays is the same as that used by the alarm relay 1580. An additional normally open contact on relays 1550, 1560 and 1570 are in parallel with one side of ground potential and the other side directed to the control logic 1110. Operation of any of these three relays would result in a ground to the control logic 1110 which will be interpreted by the control logic as an indication that the control logic should instruct the transceiver 1200 to transmit the unit status indication codes to the master station.

The reply transfer unit 1250 allows a multiplicity of gated encoding devices at the remote station to transfer parallel information to the associated transceiver 1200. The reply transfer unit consists of six identical NOR gate figures. A NOR gate when used independently will have a "one" if all of its inputs are open. Its output becomes a "zero" when any number of its inputs are connected to −16 volts. If the NOR gates are in parallel, the combined output of the gates is a "one" only when the inputs to all parallel gates are opened the combined output becomes a "zero" when any of the parallel gates has a −16 volt input. To assume the Datex encoder and access unit 1520 and to provide parallel information to the transceiver, and that other encoding devices like the Varac tank level readout unit 1530 and the indication encoder and access unit 1540 are also connected to the inputs of the reply transfer unit 1250. At a given time only one encoder will be energized or operated at a time. Outputs 1 through 12 therefore of the Datex encoder and access unit 1520 is connected to the inputs of the reply transfer unit 1250 and the common brushes of the encoding device are connected by means of encoding discs to the input gate circuits. This will act then to gate the reply transfer unit to accept the incoming information for transmission to the master station.

OPERATIONAL DESCRIPTION

The following overall operational description will be best understood by reference to FIGURES 3 through 10 taken in combination as pertains to the master station and FIGURES 11 through 15 taken in combination for the remote station.

Scan messages are normally generated by counters in the scan message unit 600. This counter consisting of scan counters 632, 642 and 652 and sequentially generates 1000 messages numbered 000 to 999, and is incremented from one message to the next by the system control logic 500. To allow for deviation from the normal sequential generation of messages, the scan message circuit contains jump logic consisting of jump logic units 631, 641 and 651, which have inputs from the scan matrix 700.

An example of the use of the jump logic and hence the deviation of the sequential generation of messages is as follows: Assume the scan matrix 700 selection relays are associated with the address point 000, 001 and 009. Since only three addresses are required to scan these three relays it is necessary to jump from 001 to 009. To accomplish this jump the selection relay 781 for point 001 has three outputs at the contacts designated 781B to the jump logic common decimal highways. When an increment signal is received by the scan message unit 600 from the system control logic 500, which would normally cause generation of code 002 the presence of signals on the H0, T0 and U9 common highways of the jump logic will write into the counters 632, 642 and 652 of the scan message unit 600 via the jump logic units 631, 641 and 651, the message 009. Hence in this scan, the addresses 002 to 008 inclusive will be skipped over. Using the exact same technique other unused addresses may be jumped. The scan message unit 600 can be programmed to jump forward or backwards.

The system control logic 500 provides a "transmit pulse" to the transceiver 300 when a scanner control message is to be transmitted. Early in its resultant transmit cycle, the transceiver 300 will load itself with the parallel message obtained via the message selector 350 from either the control message unit 400 or the scan message unit 600. It will then serialize and twice transmit the message along with start and stop synchronization bits to the remote stations via the associated tone transmitter 301.

In response to a message from the master station, a remote station will select information or a control function associated with the message. It will then twice transmit to the master station a reply containing the selected information or a control answer back signal. This transmission is serially received by the tone receiver 302, converted to D.C. pulses and presented to the transceiver 300 for serial to parallel conversion and error detection. The transceiver 300 will provide the system control logic 500 with a "last word received" signal and "word pulses." The presence of the last word signal and a word pulse will inform the logic that a completed message has been received.

If no "error" signal is present, the logic will then provide a "reply" pulse to the decoder equipment 800 to remove a "no reply" signal from the indication decoder 820 to allow these circuits to accept a reply received in response to a scan message. In addition the system control logic 500 provides a "set signal" to the matrix 700 which is relayed and distributed when required to a selected in line display such as 940 to 950. This set signal releases the old information from storage and allows the reply to be stored and displayed. When all gating signals have been completed, the logic will provide an increment signal to the scan message unit 600 and a transmit signal to the transceiver 300 to interrogate the next point in the scan.

In response to a reply which is an answer back to a control message, the logic will provide an "answer back" to the unit indication circuit 920 which will be used to initiate a visual indication associated with the pushbutton that initiated the control message and the operation of which preceded the answer back reply.

For each message in the scan message unit program there exists a corresponding selection figure in the scan matrix 700. In the scan matrix 700 shown there are nine addresses and hence there are nine selection relays in the scan matrix 700. In actual application there can be as many 1000. A selection relay may select an alarm, isolation gate or unit status indicator in the indication equipment 900. Each selector relay is operated when its corresponding address or message is present in the scan message unit 600. These addresses are converted from a 7-4-2-1 code to decimal outputs by the scanners 701, 702 to 712 inclusive and the digit decoder 799. This decoding is performed as follows: the units digit is decoded by scanner 701 which presents ten decimal outputs to the selector relays. The tens digit is decoded by the decoder 799 and presented to one of the scanners 702 through 712 in accordance with the selected digit. The hundreds digit extended from the scanner 652 to the appropriate scanner in the group 702 through 712 in the scan matrix 700. The units scanner 701 and a particular hundreds scanner form a hundred point matrix and there can be as many tens and hundreds decoders and ten one hundred point matrices can be present in the system. The ten matrices could operate 1000 selection relays. For example in the scan matrix shown only the zeros hundreds decoders and nines hundreds decoders are present. These outputs along with the common unit drivers provide the possibility of two one hundred point matrices in this case the zero hundreds group and the nine hundreds group. Only nine selection relays have been shown connected in the matrix.

In addition to selecting indicators or in line display units the selector relays in the scan matrix 700 prepare individual communication alarm circuits to receive the common fault signals generated by the communications monitor 570. The first selected figure in the scan of a station signals the communication monitor that a new station is being scanned. This occurs at contacts 780C for example. All the selection relays may be used to program the scan message unit 600. All the selection relays shown by application of ground through their respective associated contacts can prepare the station common alarm unit 670 for operation in response to communication monitor 570 and select the relays 780 and 786 which would represent the first point in two different remote stations and provide a signal to the communication monitor 570 to indicate when the first point in a new station is being scanned. This signal remains locked until changed by scanning of a subsequent station. In addition the common highways to the jump logic are shown with contacts for advance of logic on a jump basis associated with relays 781, 784 and 787. The last selector relays would jump the logic from address 001 to 009, from 011 to 019 and from 991 to 999 respectively.

Information received from the remote stations is presented to the indication decoder 820, Datex code converter 830 or Varac code converter 860. All of these units are simultaneously activated by the system control logic 500. Regardless of the type of reply, each unit will perform the respective functions on the reply and may place information on their common respective highways, however only the indication figures such as 910, 920 or 930 or the in line displays such as 940, and 950 selected by the scan matrix 700 will be prepared to accept the reply. Storage for replys of this type of information are as follows:

The alarm status is reported to an alarm indicator like 910 which is associated with alarm indication decoder 820 and specifically, a relay driver 824 and its associated contacts 834. Alarm indicator 910 is selected to receive information by operation of relay 780 in the scan matrix which was operated in response to receipt of the scan code 000. The status of an alarm is interrogated by the scan message and alarm indicator 910 is selected by operation of relay 780 and if an alarm code is received from the remote station by the transceiver it is extended through the transceiver to the indication decoder 820 to operate relay driver 824 to extend ground to alarm indicator 910 through contacts 834. If a subsequent interrogation results in a no alarm reply of the alarm indicator the alarm will be released from storage with the associated selection figure of the scan matrix, providing the alarm has been recognized by the operator.

The unit condition indicator 920 is selected by selector relay 781 associated with the code address 001 in the scan matrix 700 the unit condition indicator 920 receives indications of on, off or in transit. This device also receives a signal from the control message unit 400 when a change in status is to be expected as the result of the depression of an associated control button. When the signal is initiated by the control message unit an associated visual indicator is lit and in response to the answer back signal extinguishes. Isolation gate indicator 930 is selected by the selector relay 782 in the scan matrix 700 which is associated with the code 009 like the other indicators it operates in response to signals received through the indication decoder 820. In addition on or off pushbuttons to operate a particular isolation gate in the control message unit 400 will present similar visual indications to that associated with the unit condition indicator 920. When a data point is interrogated it will receive tank level information. In line display 950 is actuated by operation of the selector relay 784 associated with the code address 011. When the information is received and converted by the Varac code converter 860 a set signal generated by the system control logic and relayed through the scan matrix will be the set signal from the associated selector relay to the in line display 950 and will remove the old data from storage and allow the new information presented by the Varac code converter 860 to be accepted and displayed. In addition to providing a visual decimal display, the in line display unit 950 provides storage which is accessed by the data logger 1000 through the use of the 8-4-2-1 common output taken from leads V1 through V5 inclusive.

Likewise information received when interrogating various data points which respond in Datex code with Datex code indications in line display 940 will be actuated by operation of relay 783 in the scan matrix and in response to receipt of this information will display it in the in line display 940. The information stored via leads U, T and H can be extended to the data logger 1000 for recording therein.

A generation of a control message can only be initiated while the system is in automatic scan. When the message has been transmitted, automatic scan will be resumed. The scan messages are programmed in the scan matrix 700 shown here with addresses from 000 to 019, the control messages are programmed 090 to 099. In a practical embodiment the scan message addresses would start with 000 and continue upwards and control messages would be programmed starting with 999 and working downwards until they would meet the scan code if such a condition should become necessary. Normally scan codes and control codes are never intermixed in most cases adequate scan and control points in the system can be provided well within the 1000 codes available.

Control of the control message is established by operation of an associated pushbutton with each control message selector relay such as the pushbuttons 460', 470' and 480' associated with relays 460, 470 and 480, respectively. For each function of a pump motor valve or other unit in a remote station there must be a separate control message address selector relay with associated control message address. For example if there were ten pumps in a given remote station and each of these were to be turned on or off a total of 20 control message codes would be required with the associated equipment. Each control function has an associated address. As shown here the code address 099 is associated with point selector relay 460 and will affect an on function to the unit in a single remote office. Depression of the pushbutton associated with relay 470 in the code 091 will affect an off condition at a given remote control point and operation of pushbutton 480' will operate relay 480 associated with the code 090 to affect reset of a control unit in a remote station. Operation of the appropriate pushbutton will place battery on the point control encoding highways to the control message unit 400, associated point control encoder 430 will accept the decimal signals and present the binary coded decimal equivalent to the register driver 420 from whence there will be extended to the message selector 350. Simultaneously a signal will be presented from the control relay selected to the mode register and logic 520 of the system control logic 500. The logic will respond by providing a register operate and register hold signal to the register driver 420. In addition it will provide a selector hold signal to the message selector 350 plus the address selected will be stored and locked in the control register at the same time the control logic will complete its interrogation of the point which it was scanning when the point control was requested and will then provide a selector operate signal to the message selector. The message selector will connect the output of the control register to the transceiver's parallel input, after allowing sufficient time for all connections to be made the logic will instruct the transceiver to transmit. If a reply message received resulted in a control message with or without error regardless of reply content the logic will interpret this as an answer back and will present an answer back signal to the indication circuit and prepare visual indication associated with the operated pushbutton. After receiving an answer back or after allowing sufficient time for one to be received the logic will release the control register 420 in the message selector 350. The automatic scan will then be resumed from the point of interruption.

Point communication faults are determined by the system control logic 500. Station communication faults are determined by the communication's monitor 570. Each remote station has a station communication alarm circuit and a point communication alarm circuit. These alarm circuits are shown as point communicaiton alarm 660 and station communication alarm 670 and are operated by the communication monitor 570. They are selected for updating by the scan matrix selector relays such as 780, 781, etc.

Failure of a point in a remote to reply without error to three consecutive interrogations constitutes a point communication fault. Three consecutive point communication faults within a station constitute a station communication fault. A station communication fault can be caused by common equipment such as malfunction in remote or master station transceivers or tone equipment. A communication failure of a single point can generally be attributed to the faulty end element device in the remote station. Operation of the system during communications faults is as follows. After three consecutive interrogations of point without an error failure reply the system control logic 500 will present a point communication fault signal to the communication monitor 570. The signal to be relayed is a point communication alarm to the point communication alarm circuit 660. The point communication alarm circuit 660 selected by the scan matrix will be energized and both visual and audible alarms will occur. Recognition and silencing of the alarm by the operator will prevent an audible alarm from sounding each time the point is interrogated in the scan. However the visual display will flash each time the point or any subsequent point in the station affects a point communication alarm. Each time a point communication fault signal occurs it is counted by the communication monitor 570. Each time a point replies successfully the monitor is reset. Each time the first point in a station is interrogated the communication monitor is reset by the presence of a new station signal from the scan matrix 700 and a word pulse from the transceiver 300. The resetting of a monitor at the beginning of each station scan and when a successful reply is received, insures that only consecutive point communication faults within a station shall be counted if three such faults occur which meet the level requirements, a station communication alarm signal will be presented to the station communication alarm circuit 670. The circuit selected by the scan matrix will be energized and both a visual and audible signal will occur. When silenced by the operator the visual indication will remain until reply is received from the station whereby it will be removed by a station communication alarm release signal from the indication monitor 570. Each flow data point in a system which requires deviation detection and a connection to a flow rate monitor such as 1001. The monitor detects changes in the stored data of the flow's in line display 940 at the master station. Upon receipt of the change of plus or minus ten barrels, the monitor will recheck the storage upon which each updating to insure that subsequent changes do not exceed a value between plus or minus ten to plus or minus 100 barrels set on associated digit switches within the flow rate monitor. When a deviation occurs which exceeds the set limit a flow rate alarm circuit 1002 associated with the monitor 1001 will energize and provide visual and audible alarms. In addition a special logging cycle by the data logger 1000 will be initiated. The monitor will automatically reset if the rate of change does not exceed the limits within the period set on a 0–30 minute timer. A new base will then be established to monitor the initial plus or minus ten barrel deviation. A zero to thirty minute lockout time is provided in each monitor for an upset condition when an associated pumping unit is started from the master station. The in line display for the point represented by the address 010 will cause an associated flow rate monitor 1002. The monitor receives a check pulse signal from the selection figure 011 in the scan matrix. Therefore the flow is checked immediately after the in line is updated. Timer pulses are provided by the system control logic 500 to each flow rate monitor which is used by a monitor's logic when the flow is being checked. Four or six pulses are required and hence, each monitor provides reset one and reset two signals to the system control logic 500 to stop the timer after four or six pulses respectively.

Data logging is performed periodically on demand and when a flow rate alarm occurs. The data logger 1000 receives data from the in line displays 940 or 950 which it sequentially accesses when a log is required.

When information is obtained from an in line display such as 1040, which is connected to the associated flow rate monitor 1001, the stored digits are continuously presented in parallel to the data logger and sequential selection of each digit becomes an internal function of the logger. Other in line displays such as 950 are accessed by the data logger in exactly the same manner.

The remote station operation will be best understood by referring to FIGURES 11, 12, 13, 14 and 15 in combination.

Transmissions from the master station are serially received by tone receiver 1101 and each bit is presented to the transceiver 1200 as one of two D.C. levels for serial to parallel conversion. The transceiver, constant ratio and serial parity checks on the transmission to detect for errors. When the transmission from the master station is completed and no errors have been detected the transceiver will enable the point selector unit 1400 by signalling that it is in the steady state and that no error has been detected. The point selector will then extend to decoder 1300 a coded parallel three decimal digit coded message presented by the transceiver shift register 1220. The transceiver also decodes the complement of the message and presents decimal outputs to the point selector unit 1400.

The decimal outputs of both the transceiver 1200 and the point selector unit 1400 are combined in such a way in the point selector circuit 1400 as to insure a proper decode of the message. If both outputs contain the same information the point selector unit 1400 common decimal highways will be energized. Final decoding is performed by the point selector relays 1410, 1420–1480 etc. associated with the unique addresses being transmitted. For example assume address 000 was received. The hundreds, tens and units decoders 1310, 1340 and 1370 respectively will place signals on the H0, T0 and U0 common highways respectively. The selector relay associated with address 000 in this case 1410 will be energized. All others will not be energized because all three inputs to the selection figure require signals for operation. The operation of any point selector relay will result in a reply transmission by the remote to the master station. The transmission may contain information obtained from a Datex encoder, from a Varac encoder, from the point indication decoder or may simply contain all zeros in the case of an answer back to the selection of the control function. All information other than that for an answer back is presented to the reply transfer unit 1250 in parallel form. The reply transfer unit 1250 inverts and relays the information presented on one of its parallel inputs to the parallel input of the transceiver 1200. When the transceiver 1200 is instructed to transmit it will place the information presented by the reply transfer unit 1250 into internal storage and serially key the tone transmitter 1102 until the message has been twice transmitted to the master station. It will then revert to its receive mode.

The transmission message from the remote is affected in the following manner: any point selector relay operated by signals in the point selector unit 1400 is immediately held operated by a signal on the common hold highway through contacts as 1413, 1423 etc. which extend to the control logic 1110. Then either directly by the point selector relay or indirectly by the resultant operation by a point indication encoder 1540 or the tank level readout 1550 a signal will be placed on the transmit common highway to the control logic 1110. This signal results in operation of the line relay in the control logic 1110. The line relay through its associated contacts 1173 and 1174 will connect the output of the tone transmitter 1102 to the remote to master station communication link. Operation of the line relay will also result in a transmit signal to the transceiver by application of ground to relay driver 1120 at contacts 1171. The transceiver 1200 will then enter its transmit mode of operation, holding the line relay operated, with a "transmit mode" signal, load itself with information from the reply transfer unit 1250 and serially key the tone transmitter 1102. During transmission of the last word of the second message, the transceiver 1200 will signal the control logic 1110 with a "last word" transmit output to relay driver 1150. This signal will effect removal of signal on the hold common highway of the control logic 1110 and the operated point selector relay whose operation precipitates the reply transmission will be released. When the transceiver 1200 completes the reply transmission, it will remove its transmit mode signal from the control logic 1110 and hence the line relay 1170 will deenergize. The tone transmitter will be removed from the communication link and the remote station hence will be awaiting the next transmission from the master station. Various selector relays or point selector 1400 operate as follows:

Line selector relay 1410 associated with reference address 000 places ground at its associated contacts 1414 to alarm monitor 1542 where if an alarm condition exists the internal contacts 1542A will be closed and the path completed through to the alarm relay 1580 in the indication encoder and access unit 1540 which will apply an appropriate signal in the reply transfer circuit in accordance therewith. This information is then transmitted to the master station in the manner previously described.

Operation of relay 1420 characterized by the access code 001 will place ground in its associated contacts 1424, 1425 and 1426 on the side of the internal contacts 1541A, B and C of valve pump or motor monitor unit 1541 if any of these contacts are closed indicating off, on or in transit condition of the device associated with the monitor, the associated relay such as 1560, 1570 or 1580 will be operated and in turn extend the necessary coded response to the reply transfer circuit 1250 for transmission to the master station.

Operation of relay 1430 associated with the code address 009 will extend ground at its contacts 1434 to the internal contacts 1543A of isolation gate valve monitor 1543, these contacts shall be closed, an isolation gate indication will be given by operation of relay 1590, which in turn will result with the coded information being extended to the reply transfer unit 1250 and there again being extended to the transceiver 1200 for transmission to the master station.

Operatiton of relay 1440 associated with the address code 010 will place battery at its contacts 1444 to the Datex encoder of access unit 1520, which will then interrogate a rate of flow or pressure transducer such as 1521 for its current information, which in turn it will extend to the reply transfer unit 1250 for transmission to the master station.

Likewise operation of relay 1450 associated with the code address 011, will extend ground at its contacts 1454 to the Varac tank level readout of access unit 1530 which will then take the information received from liquid level indicator 1531 and extend it to the reply transfer unit 1250 for transmission to the master station.

Operation of relay 1460 associated with address code 090 will extend ground via its associated contacts 1464 to the control point access unit 1510 where it will be extended to a valve or pump alarm unit such as 1512 for resetting at the device. Operation of this selector relay also results in the signal being placed on the transmit common highway control logic 1110. Since no information is presented to the reply transfer circuit 1250, the transceiver will transmit a message containing all zero bits. This is the control "answer back" message.

Likewise operation of relay 1470 and 1480 associated with the code 091 and 099 respectively will also place ground to establish on or off control functions via the control point access unit 1510 and extend these functions to the valve or pump control units 1511 which form a part of the pipeline control equipment 1501. Here, too, an answer back condition will be transmitted to the master station to acknowledge receipt of the control address.

What is claimed is:

1. In a supervisory control and telemetering system, a master station including a scan message unit and a control message unit, and a remote station, a communication link connecting said master station and said remote station, equipment controlling means and equipment monitoring means at said remote station, transmitting means at said master station connected to, and operated in response to said scan message unit for automatically sequentially transmitting continuous equipment monitor digital address signals to said remote station, a message selector at said master station operated in response to manual selection of a controller digital addresses to disconnect said scan message unit from said transmitting means and to connect said control message unit to said transmitting means to further operate said transmitting means to transmit a selected equipment controller digital address signal to said remote station; receiving means at said remote station operated in response to said certain ones of said equipment monitor address signals to interrogate said monitors, and operated in response to certain ones of said selected controller addresses to actuate said controllers; transmitting means at said remote station operated in response to interrogation of said monitors and actuation of said controllers to transmit digital signals to said master station to indicate said interrogation and actuation; and means at said master station operated in response to said signals representative of said actuation and operated in response to said interrogation for indicating the significance of said signals from said remote station.

2. A supervisory control and telemetering system comprising: a master station including visual indicating equipment; a plurality of remote stations each including a plurality of equipment monitors each identified by a different digital address and a plurality of equipment controllers each identified by a different digital address; and at least one communication link connecting said remote stations to said master station; said master station including transmitting means connected to said link, a scan message unit connected to said transmitting means operated to continuously transmit a plurality of equipment monitor digital addresses, said transmitting means operated to continuously transmit each of said monitor digital addresses sequentially via said link, a control message unit operated to transmit a plurality of equipment controller digital addresses, a message selector operated in response to the manual selection of a controller digital address to disconnect said scan message unit from said transmitting means and to connect said control message unit to said transmitting means, said transmitting means further operated in response to said control message unit to transmit selected ones of said controller digital addresses via said link; each of said remote stations including, receiving means connected to said link, to said equipment monitors and to said equipment controllers, operated in response to receipt of certain ones of said monitor digital addresses to interrogate said monitors identified by said digital addresses, and in response to receipt of certain ones of said selected controller addresses to actuate said controllers identified by said controller digital addresses; transmitting means connected to said link, to said equipment monitors and to said equipment controllers operated in response to interrogation of said monitors to transmit digital signals representative of the status of each of said monitors, and operated in response to actuation of said controllers to transmit digital signals acknowledging operation of said controllers to said master station via said link; said master station further including receiving means connected to said link and to said indicating means, operated in response to receipt of status signals and operated in response to receipt of acknowledgment signals to operate said indicating means, to indicate the status of each of said equipment monitors and indicate operation of said equipment controllers associated with said selected controller addresses.

3. A supervisory control and telemetering system comprising a master station including visual indicating equipment, a plurality of remote stations each including a plurality of equipment monitors each identified by different digital addresses and a plurality of equipment controllers each identified by a different digital address, and at least one communication link connecting said remote stations to said master station, said master station including: transmitting means automatically operated to continuously transmit each of said monitor digital addresses sequentially; receiving means connected to said indicating means, operated in response to receipt of digital signals representative of the status of each of said monitors and operated in response to digital signals acknowledging operation of said controllers, to operate said indicating means to indicate the status of each of said equipment monitors and indicate operation of said equipment controllers associated with said selected controller addresses; said master station receiving and transmitting means in combination comprising a transceiver tone transmitting means connected between said transceiver and said link operated in response to coded digital addresses received from said transceiver to transmit tone signals via said link; tone receiving means connected to said link operated in response to receipt of tone signals representative of digital status signals and digital acknowledgment signals to transmit said signals to said transceiver; a scan message unit connected to said transceiver operated to continuously transmit a plurality of equipment monitor digital addresses; a control message unit operated to transmit a plurality of equipment controller digital addresses; and a message selector operated in response to the manual selection of a controller digital address to disconnect said scan message unit from said transceiver and connect said control message unit to said transceiver to stop said continuous automatic transmission of said monitor digital addresses and transmit selected ones of said controller digital addresses via said link.

4. A supervisory control and telemetering system as claimed in claim 3, wherein said master station includes: a data logger connected to said indicating equipment automatically operated to periodically record the status information displayed by said indicating equipment.

5. A supervisory control and telemetering system as claimed in claim 3, wherein said scan message unit comprises: counting means operated to sequentially produce a continuous plurality of digital addresses; a plurality of code converters connected to said counting means, operated in response to receipt of said digital addresses to convert said digital addresses to coded addresses; jump logic means connected to said counting means operated to cause said counting means to jump certain selected ones of said plurality of digital addresses.

6. A supervisory control and telemetering system as claimed in claim 3, wherein said master station further includes: a scan matrix unit connected to said scan message unit, and to said indicating equipment, operated in response to receipt of coded digital addresses from said scan message unit to condition said indicating equipment to receive digital status messages from said transceiver.

7. A supervisory control and telemetering system as claimed in claim 6, wherein said scan matrix comprises: scanning means connected to said scan message unit, operated to provide a plurality of digital markings in response to said digital address transmitted by said scan message unit; a plurality of scan point relays each connected to said scanning means and to said indicating means, each operated in response to receipt of a particular marking from said scanning means to condition the indicating equipment associated with said address marking; and a certain portion of said plurality of said scan point relays each operated in response to receipt of a particular marking.

8. A supervisory control and telemetering system as claimed in claim 6, wherein said master station includes: a communication monitor connected to said transceiver and to said scan matrix, operated in response to transmission of a first digital address assigned to one of said plurality of remote stations to provide an indication of said transmission.

9. A supervisory control and telemetering system as claimed in claim 8, wherein said master station further includes: control logic means comprising a reply register connected to said transceiver, to said indicating equipment, and to said scan matrix, operated in response to digital receipt of signals from one of said remote stations by said transceiver to condition said indicating equipment to receive a coded status signal, and further operated to transmit an enabling pulse to said scan message unit to transmit the next sequential digital address; an interrogation counter connected to said reply register and to said communication monitor, operated in response to a predetermined plurality of unsuccessful interrogations of one of said remote stations to operate said monitor to provide an indication of said unsuccessful interrogation; and a mode register connected to said transceiver operated to indicate the transmit mode in response to a first marking and further operated to indicate the receive mode in response to a second marking and provide a plurality of enabling pulses to said reply register and said interrogation counter and to condition said control message unit for operation; said control logic further including first key switch means connected to said mode register, manually operated to control said mode register to stop the automatic operation of said scan message unit; and a second key switch means connected to said mode register manually operated to control said mode register to start the automatic operation of said scan message unit.

References Cited
UNITED STATES PATENTS

| | | | |
|---|---|---|---|
| 3,045,210 | 7/1962 | Langley | 340—163 X |
| 3,046,525 | 7/1962 | Deming et al. | 340—163 |
| 3,110,013 | 11/1963 | Breese | 340—163 |
| 3,122,722 | 2/1964 | Subry et al. | 340—163 X |
| 3,244,805 | 4/1966 | Evans | 340—163 X |
| 3,075,177 | 1/1963 | Derr et al. | 340—163 |
| 3,099,816 | 7/1963 | Miller | 340—163 |

JOHN W. CALDWELL, *Primary Examiner.*

H. I. PITTS, *Assistant Examiner.*

UNITED STATES PATENT OFFICE
CERTIFICATE OF CORRECTION

Patent No. 3,397,386                                August 13, 1968

Bernard W. Bishup et al.

It is certified that error appears in the above identified patent and that said Letters Patent are hereby corrected as shown below:

Column 5, line 16, "eading" should read -- reading --; line 61, "matter" should read -- master --. Column 6, line 33, "decodes" should read -- decoder --; line 41, "Varca" should read -- Varac --. Column 12, line 48, "reecive" should read -- receive --. Column 14, line 75, "simultaneouslp" should read -- simultaneously --. Column 17, lines 12 and 13, "and when" shoul read -- wherein --. Column 20, line 57, "525" should read -- 535 --. Column 23, line 50, "710" should read -- 701 --; line 52, "011" should read -- 001 --. Column 24, line 20, "on the highway" should read -- on the on highway --; line 36, "discusio should read -- discussion --. Column 27, line 33, "direct" should read -- directs --. Column 28, line 43, "colck" should read -- clock --. Column 29, lines 20 and 21, "inclueds" should read -- includes --; lines 72 and 73, "con- will either be returned from one of the" should read -- contacts 1151 would be closed. The selected --. Column 30, line 22, "reenergize" should read -- deenergize --. Column 44, line 13, "digital receipt of" should read -- receipt of digital --.

Signed and sealed this 24th day of February 1970.

(SEAL)
Attest:

EDWARD M. FLETCHER, JR.                      WILLIAM E. SCHUYLER, JR.
Attesting Officer                                Commissioner of Patents